(12) United States Patent
Vander Hoff et al.

(10) Patent No.: US 10,786,784 B2
(45) Date of Patent: Sep. 29, 2020

(54) PERMEATE CHANNEL ALTERATIONS FOR COUNTER CURRENT FILTRATION FOR USE IN CROSS-FLOW FILTRATION MODULES USEFUL IN OSMOTIC SYSTEMS

(71) Applicant: SMARTFLOW TECHNOLOGIES, INC., Apex, NC (US)

(72) Inventors: Mark Vander Hoff, Apex, NC (US); Todd Benson, Cary, NC (US); Marc Pugh, Sanford, NC (US)

(73) Assignee: SmartFlow Technologies, Inc., Sanford, NC (US)

( * ) Notice: Subject to any disclaimer, the term of this patent is extended or adjusted under 35 U.S.C. 154(b) by 754 days.

(21) Appl. No.: 14/425,681

(22) PCT Filed: Sep. 6, 2013

(86) PCT No.: PCT/US2013/058445
§ 371 (c)(1),
(2) Date: Mar. 4, 2015

(87) PCT Pub. No.: WO2014/039780
PCT Pub. Date: Mar. 13, 2014

(65) Prior Publication Data
US 2015/0209731 A1    Jul. 30, 2015

Related U.S. Application Data

(60) Provisional application No. 61/697,623, filed on Sep. 6, 2012.

(51) Int. Cl.
*B01D 61/00* (2006.01)
*B01D 63/08* (2006.01)
(Continued)

(52) U.S. Cl.
CPC ......... *B01D 61/002* (2013.01); *B01D 63/082* (2013.01); *B01D 63/084* (2013.01);
(Continued)

(58) Field of Classification Search
CPC .. B01D 61/002; B01D 61/025; B01D 61/027; B01D 63/082; B01D 63/084;
(Continued)

(56) References Cited

U.S. PATENT DOCUMENTS 1,849,622 A * 3/1932 Heibig ................... B01D 61/30
                                                   210/541
3,943,057 A * 3/1976 Jamet ..................... B01D 53/22
                                                   210/321.84
(Continued)

FOREIGN PATENT DOCUMENTS

WO    WO 199628240    9/1996
WO    WO 2002058827   8/2002
(Continued)

OTHER PUBLICATIONS

Logan, Bruce E., et al.; "Membrane-based processes for sustainable power generation using water," Review, Nature, 2012, pp. 313-319, vol. 488.

*Primary Examiner* — Lucas A Stelling
*Assistant Examiner* — Angel Olivera
(74) *Attorney, Agent, or Firm* — Tristan A. Fuierer; Marianne Fuierer; Olive Law Group, PLLC

(57) ABSTRACT

The present invention relates to modification to permeate channels and permeate materials in a cross-flow filtration system to improve performance in counter current filtration having both retentate channels and permeate channels wherein a solution is pumped through one of the channels and drawn through a membrane to one of the other channels to assist in positive pressure driven filtration by using the
(Continued)

osmotic pressure, concentration, or preferential solubility difference between the retentate and permeate flow streams thereby increasing or altering the flux through the membrane separating the flow streams.

16 Claims, 17 Drawing Sheets

(51) Int. Cl.
*C02F 1/44* (2006.01)
*B01D 25/12* (2006.01)
*B01D 25/21* (2006.01)
*B01D 61/02* (2006.01)
*C02F 103/08* (2006.01)

(52) U.S. Cl.
CPC ............ *B01D 63/085* (2013.01); *C02F 1/445* (2013.01); *B01D 25/12* (2013.01); *B01D 25/122* (2013.01); *B01D 25/21* (2013.01); *B01D 25/215* (2013.01); *B01D 61/025* (2013.01); *B01D 61/027* (2013.01); *B01D 2311/06* (2013.01); *B01D 2313/08* (2013.01); *B01D 2313/12* (2013.01); *B01D 2313/143* (2013.01); *B01D 2313/146* (2013.01); *B01D 2313/19* (2013.01); *B01D 2313/21* (2013.01); *B01D 2315/10* (2013.01); *B01D 2315/16* (2013.01); *B01D 2319/04* (2013.01); *C02F 2103/08* (2013.01); *C02F 2201/006* (2013.01)

(58) Field of Classification Search
CPC ............ B01D 2311/06; B01D 2313/08; B01D 2313/12; B01D 2313/19; B01D 2313/21; B01D 2313/143; B01D 2313/146; B01D 2315/10; B01D 2315/16; B01D 2319/04; B01D 63/085; B01D 25/215; B01D 25/21; B01D 25/12; B01D 25/122; C02F 1/445; C02F 2103/08; C02F 2201/006
See application file for complete search history.

(56) References Cited

U.S. PATENT DOCUMENTS

| | | | | |
|---|---|---|---|---|
| 4,212,742 A | * | 7/1980 | Solomon | B01D 63/082 210/247 |
| 4,867,876 A | | 9/1989 | Kopf | |
| 4,882,050 A | | 11/1989 | Kopf | |
| 4,956,085 A | | 9/1990 | Kopf | |
| 5,034,124 A | | 7/1991 | Kopf | |
| 5,049,268 A | | 9/1991 | Kopf | |
| D322,117 S | | 12/1991 | Kopf | |
| D323,202 S | | 1/1992 | Kopf | |
| D324,720 S | | 3/1992 | Kopf | |
| D325,070 S | | 3/1992 | Kopf | |
| D327,313 S | | 6/1992 | Kopf | |
| D328,789 S | | 8/1992 | Kopf | |
| 5,232,589 A | | 8/1993 | Kopf | |
| 5,342,517 A | | 8/1994 | Kopf | |
| D357,059 S | | 4/1995 | Kopf | |
| 5,593,580 A | | 1/1997 | Kopf | |
| 5,868,930 A | * | 2/1999 | Kopf | B01D 63/081 210/231 |
| 6,022,742 A | | 2/2000 | Kopf | |
| 6,048,727 A | | 4/2000 | Kopf | |
| 6,139,746 A | | 10/2000 | Kopf | |
| 6,214,221 B1 | | 4/2001 | Kopf | |
| 6,214,574 B1 | | 4/2001 | Kopf | |
| 6,383,380 B1 | | 5/2002 | Kopf | |
| 6,569,340 B2 | | 5/2003 | Kopf et al. | |
| 6,596,172 B1 | | 7/2003 | Kopf | |
| 6,827,960 B2 | | 12/2004 | Kopf et al. | |
| 6,852,352 B2 | | 2/2005 | Kopf et al. | |
| 6,875,459 B2 | | 4/2005 | Kopf et al. | |
| 6,946,075 B2 | | 9/2005 | Kopf | |
| 7,544,296 B2 | | 6/2009 | Kopf et al. | |
| 2005/0269255 A1 | | 12/2005 | Herezeg | |
| 2007/0056894 A1 | * | 3/2007 | Connors, Jr. | B01D 63/081 210/321.75 |
| 2008/0251444 A1 | | 10/2008 | Fendya et al. | |
| 2009/0145831 A1 | | 6/2009 | Manabe et al. | |
| 2010/0006504 A1 | * | 1/2010 | Odaka | B01D 63/103 210/651 |
| 2011/0309018 A1 | | 12/2011 | Kopf et al. | |
| 2012/0205311 A9 | | 8/2012 | Kopf et al. | |
| 2013/0015119 A1 | * | 1/2013 | Pugh | B01D 63/087 210/321.6 |
| 2013/0115588 A1 | | 5/2013 | Davis et al. | |
| 2013/0212932 A1 | | 8/2013 | Bell et al. | |
| 2013/0236938 A1 | | 9/2013 | Vander Hoff et al. | |

FOREIGN PATENT DOCUMENTS

| | | | | |
|---|---|---|---|---|
| WO | WO2007030747 | | 3/2007 | |
| WO | WO-2011066498 A2 | * | 6/2011 | ......... B01D 63/087 |
| WO | WO 2011130617 A2 | * | 10/2011 | ........... C12M 23/28 |
| WO | WO 2012115932 | | 8/2012 | |

* cited by examiner

| Endplate (125) |
|---|

| Retentate (170) |
|---|

| Filter sheet (172)<br>Permeate direction flow media (174)<br>Filter sheet (172) |
|---|

| Retentate (170) |
|---|

| Filter sheet (172)<br>Permeate directional flow media (174)<br>Filter sheet (172) |
|---|

| Retentate (170) |
|---|

| Endplate (125) |
|---|

Figure 9A

Endplate (125)

Retentate (170)

Filter sheet (172)
Permeation directional material (174)
Permeate direction flow media (176)
Permeation directional material (174)
Filter sheet (172)

Retentate (170)

Filter sheet (172)
Permeation directional material (174)
Permeate direction flow media (176)
Permeation directional material (174)
Filter sheet (172)

Retentate (170)

Endplate (125)

Figure 9B

Endplate (125)

Retentate (170)

Filter sheet (172)
Permeate direction flow material (176)
Filter sheet (172)

Retentate (170)

Filter sheet (172)
Permeate direction flow material (176)
Filter sheet (172)

Retentate (170)

Endplate (125)

Figure 9C

PERMEATE CHANNEL ALTERATIONS FOR COUNTER CURRENT FILTRATION FOR USE IN CROSS-FLOW FILTRATION MODULES USEFUL IN OSMOTIC SYSTEMS

CROSS-REFERENCE TO RELATED APPLICATIONS

This application is filed under the provisions of 35 U.S.C. § 371 and claims the priority of International Patent Application No. PCT/US2013/058445 filed on Sep. 6, 2013, which in turn claims priority to U.S. Provisional Application No. 61/697,623 filed on Sep. 6, 2012, the contents of which are incorporated by reference herein for all purposes.

BACKGROUND OF THE INVENTION

Field of Invention

The present invention relates to modification to permeate channels and permeate materials in a cross-flow filtration system to improve performance in counter current filtration.

Related Art in Technical Field

Many industrial and scientific operations today depend upon filtration to separate valuable, nutrient or metabolic substances from stream including unwanted or unusable products. These operations include direct osmosis, reverse osmosis and nanofiltration methods that involve passage of fluids with the desired target substance over semipermeable membranes and the separation from unwanted products. Membrane-retained components are collectively called the concentrate or retentate. Materials permeating the membrane are called the filtrate or permeate.

Osmosis is natural movement of solvent molecules from a lower solute concentration to a region of a higher solute concentrate to equalize the solute concentration on both sides of a separating membrane. Osmosis pressure is defined as the pressure required to maintain an equilibrium between both sides of the separating membrane.

There are numerous variations of osmosis, including reverse osmosis and forward osmosis. Reverse osmosis is a separation process that uses pressure to force a solvent from a region of high solute concentration to a region of low solute concentration by apply pressure in excess of the osmosis pressure. For example, the external pressure forces the solvent through the membrane and retains the solute on the other side. Reverse osmosis is used for purifying saltwater by removing the salt particles and providing for drinkable fresh water.

Forward osmosis can be used in a separation process to achieve separation of water from a solution containing unwanted solutes. In forward osmosis, an additional highly concentrated solute is used to induce a flow of water through the membrane to separate water from the unwanted solutes it contains. Such forward osmosis can be used for hydration bags to separate clean water from unhealthy surface water, wherein the clear water is moved into a bag containing a solute such as glucose.

Cross-flow membrane filtration systems and processes are routinely employed for nanofiltration and osmosis-type processes. However, these may involve large operating costs for energy and chemicals in addition to the initial capital expenses of construction and plumbing, and they require periodic membrane or cartridge replacement. Further, the efficiency of the systems can be compromised by flow of the solutions and clogging of membranes.

Thus, it would therefore be desirable to provide a cross flow filter assembly and associated fittings of enhanced design versatility and/or performance.

SUMMARY OF THE INVENTION

The present invention relates to modification to permeate channels and permeate materials in a cross-flow filtration system to improve performance in counter current filtration having both retentate channels and permeate channels wherein a solution is pumped through one of the channels and drawn through a membrane to one of the other channels to assist in positive pressure driven filtration by using the osmotic pressure difference between the retentate and permeate flow streams thereby increasing or altering the flux through the membrane separating the flow streams.

In one aspect, the present invention provides for permeate channels in a filter holder end plate that are optimized to improve performance in counter current filtration where a solution is pumped through the permeate channels to draw a product though the membrane from the retentate side. Importantly, the system of the presently invention provides for a separation membrane that provides a communication connection between the fluid in the retentate channels and the fluid within the permeate channels. Such close positioning causes osmotic communication for purification and separation of two moving fluids. Further, such close communication can be effective in static osmotic systems.

In another aspect, the present invention provides for the use of a membrane flow directional media for biased permeate flow direction to preferentially direct flow of the permeate through the membrane module permeate collection area and towards the desired permeate outlet ports of the filter module holder. The permeate fluid may be introduced to flow concurrent with the direction of the retentate flow or in the alternative and preferably the permeate fluid is introduced to flow counter current to the direction of the retentate flow. The separation that results can be driven by multiple forces: including osmotic, concentration, preferred solubility, and aqueous vs. organic phases.

In yet another aspect, the present invention provides for removal of a desired product from the permeate fluid into the retentate fluid flow wherein the permeate channels in the filter endplate are adjusted to provide the most effective communication between the permeate fluid and retentate fluid.

The design of the filter holder and corresponding filter modules incorporate multiple permeate ports which enable this invention to create flow, and more specifically, directed input flow into the permeate flow directional material or permeate flow directional media, to make the described separation possible and more efficient.

In one aspect, the present invention provides for a cross-flow filtration unit providing for counter current filtration, the cross flow filtration unit comprising:
- a first and second filter endplate (125), wherein the length of each endplate along the longitudinal axis is greater than the width of such endplate;
- an array of cross-flow members or sheets comprising a first retentate sheet (170), a permeate grouping of sheets comprising a first filter sheet (172), at least one permeate flow directional material (174) or media sheet (176), a second filter sheet (172) and a second retentate sheet (170);
- an inlet retentate flow channel (145) and an outlet retentate flow channel (135) positioned at opposite ends of each filter endplate (125);

two permeate flow channels (25, 45) positioned on opposite sides of each filter endplate along the longitudinal axis of the filter endplate and perpendicular to the retentate flow channels (135, 145), wherein the depth of the permeate channels is adjustable to reduce flow or each permeate channel includes a blocking means to block flow through the length of the permeate channels;

a retentate inlet port (140) and retentate outlet port (130) in fluid communication with the retentate channels (135, 145); and at least one inlet permeate port (20) and at least one permeate outlet port (50) in fluid communication with each permeate flow channel (25, 45) and in fluid communication with the permeate group.

Importantly the flow of permeate liquid pumped into at least one of the permeate flow channels, positioned on opposite sides of each filter endplate, can be restricted or reduced by either total blockage of the channel or reducing the size of the channel, thereby forcing the flow of the permeate liquid from the permeate input port over the surface, within the woven grooves and/or a greater area of the permeate flow directional media or material.

The array of cross-flow sheets includes sheet members of generally rectangular and generally planar shape with main top and bottom surfaces. Each of the retentate sheets or members in said array has an inlet port and channel at one end thereof, and at an outlet port and channel at an opposite ends thereof, wherein each of the first and second retentate sheets has a multiplicity of flow openings therein, extending longitudinally between the inlet and outlet channels of the retentate sheets in the array, and being bonded to an adjacent filter sheet about peripheral end and side portions thereof. The permeate grouping includes at least one permeate flow directional material or media positioned between a filter sheet on each side with permeate passage openings at longitudinal side margin portions of the sheet members. The retentate flow openings and permeate passage openings are in fluid communication with one another when the target substance passes from the retentate fluid by passage through the filter media into the permeate grouping and permeate liquid flow. The permeate passage openings of each of the retentate sheets being circumscribingly bonded to the adjacent filter sheet, and with a central portion of each of the retentate sheets and adjacent filter sheets being unbonded to permit permeate contacting the retentate sheet to provide flow through the filter sheet to the permeate group of sheets.

Preferably, the permeate grouping of sheets provides for movement of a target substance from retentate fluid to flow across the filter sheets wherein solids or high-molecular-weight species of diameter larger than the filter sheet's pore size, are retained in the retentate flow, and at least a portion of the liquid medium with any permeate species diffuse through the filter sheet and enters the permeate grouping of sheets.

Additionally, the permeate grouping of sheets provides for movement of a target substance from permeate fluid to flow across the filter sheets wherein solids or high-molecular-weight species of diameter larger than the filter sheet's pore size, are retained in the permeate flow, and at least a portion of the liquid medium with any permeate species diffuse through the filter sheet and enters the retentate channels of the filter module.

Notably, the retentate flow channel and the inlet retentate port and outlet retentate port of the filter endplate is longitudinally extended beyond the permeate flow channel and inlet permeate port or ports and outlet permeate port or ports of the permeate endplate so that no retentate fluid will mix with a permeate fluid unless the retentate fluid passes through the filter sheet and into the permeate space within the grouping of sheets.

The retentate and permeate flow channels in the filter endplates may be formed by either including a recessed flow channel in the surface of the endplates or in the alternative the flow channels may be formed by providing a retentate gasket and permeate gasket having an elongated opening in each and wherein the retentate gasket is positioned directly adjacent to the second retentate surface of the retentate endplate and the permeate gasket directly adjacent to the second permeate surface of the permeate endplate.

In another, the present invention provides for a separation method of at least one target substance from a source liquid, the method comprising the steps of:

providing at least one cross-flow filtration cassette comprising:

a first and second filter endplate, wherein the length of each endplate along the longitudinal axis is greater than the width of such endplate;

an array of cross-flow members or sheets comprising a first retentate sheet, a permeate grouping of sheets comprising a first filter sheet, at least one permeate flow directional material or media sheet, a second filter sheet and a second retentate sheet;

an inlet retentate flow channel and an outlet retentate flow channel positioned at opposite ends of each filter endplate;

two permeate flow channels positioned on opposite sides of each filter endplate along the longitudinal axis of the filter endplate and perpendicular to the retentate flow channels, wherein the depth of the permeate channels is adjustable to reduce flow or each permeate channel includes a blocking means to block flow through the length of the permeate channels;

a retentate inlet port and retentate outlet port in fluid communication with the retentate channels; and at least one inlet permeate port and at least one permeate outlet port in fluid communication with each permeate flow channel and in fluid communication with the permeate group; and introducing a flow of the source liquid comprising the target substance into the input retentate port and introducing a permeate capture liquid medium into at least one input permeate port and effectuating a sufficient flow of the source liquid comprising the target substance through retentate openings for contact with the filter media. The flow through the filter media is in contact with the permeate flow direction media or material and inclusion in the permeate capture liquid medium, wherein said physical separation of target substances is based on their different molecular weights, size, osmotic pressure, concentration, preferred solubility, aqueous vs. organic phases. and/or difference and/or operating conditions.

Notably, the source liquid comprising the target substance can be pretreated to remove any unwanted material or larger solids from the source liquid before introduction into the cross-flow filtration cassette, wherein the pretreating includes systems such as centrifuge, vibrating screen, mesh screening, belt filter, screw press, hydrocylcone and other systems that may further reduce particle size and/or remove unwanted large material to ensure easy flow through the cross-flow filtration cassette of the present invention.

In yet another aspect, the present invention provides for a method for diafiltration, the method comprising:

providing at least one cross-flow filtration cassette comprising:

a first and second filter endplate, wherein the length of each endplate along the longitudinal axis is greater than the width of such endplate;

an array of cross-flow members or sheets comprising a first retentate sheet, a permeate grouping of sheets comprising a first filter sheet, at least one permeate flow directional material or media sheet, a second filter sheet and a second retentate sheet;

an inlet retentate flow channel and an outlet retentate flow channel positioned at opposite ends of each filter endplate;

two permeate flow channels positioned on opposite sides of each filter endplate along the longitudinal axis of the filter endplate and perpendicular to the retentate flow channels, wherein the depth of the permeate channels is adjustable to reduce flow or each permeate channel includes a blocking means to block flow through the length of the permeate channels;

at least one retentate inlet port and at least one retentate outlet port in fluid communication with the retentate channels; and at least one inlet permeate port and at least one permeate outlet port in fluid communication with each permeate flow channel and in fluid communication with the permeate group, wherein optionally the size of the inlet permeate port can be reduced relative to the permeate outlet port; and introducing a flow of the source solution into the input retentate port and introducing a permeate liquid medium into the input permeate ports, wherein the direction of the permeate liquid medium is counter to the flow of the retentate solution and effectuating, under pressure from between about 1 psi and about 1000 psi, a sufficient flow of the fluid containing buffers, ions, or non-target molecules through retentate openings for contact with the filter sheet that is in direct contact with the permeate flow direction media and/or material and transference of buffers, ions or non-target molecules through the filter sheet into the permeate liquid medium. The buffer, ion, or non-target molecules passage will be aided by the concentration differential between the source solution and the permeate liquid medium.

In a still further aspect, the present invention provides for desalinating seawater using the cross-flow filtration system of the present invention. As previously discussed, osmosis occurs when solutions of differing concentrations are separated by a semipermeable membrane. The osmotic pressure across the membrane is directly proportional to the difference in concentration between the two solutions. Pressure must be applied to the more concentrated solution to counteract the natural osmotic pressure being exerted upon it. Thus, to reverse the direction of the natural osmotic flow, additional pressure is required.

High pressure must be applied to the seawater to overcome the osmotic pressure in the opposite direction and under such high pressure, some potable water permeates through the semipermeable membrane, leaving the balance of the seawater and nearly all the salt retained in the retentate solution and forming a more salt-rich concentrate to be swept away under the increased pressure and resulting flow in the retentate stream. Thus, the seawater is fractionated by the permeate grouping of sheets of the present invention into a permeate of low salt concentration and a concentrate or retentate of salt concentration higher than seawater.

The present invention provides for a method for desalinating seawater, the method comprising:

providing at least one cross-flow filtration cassette comprising:
a first and second filter endplate, wherein the length of each endplate along the longitudinal axis is greater than the width of such endplate;

an array of cross-flow members or sheets comprising a first retentate sheet, a permeate grouping of sheets comprising a first filter sheet, at least one permeate flow directional material or media sheet, a second filter sheet and a second retentate sheet;

an inlet retentate flow channel and an outlet retentate flow channel positioned at opposite ends of each filter endplate;

two permeate flow channels positioned on opposite sides of each filter endplate along the longitudinal axis of the filter endplate and perpendicular to the retentate flow channels, wherein the depth of the permeate channels is adjustable to reduce flow or each permeate channel includes a blocking means to block flow through the a portion of the length of the permeate channels;

at least one retentate inlet port and at least one retentate outlet port in fluid communication with the retentate channels; and at least one inlet permeate port and at least one permeate outlet port in fluid communication with each permeate flow channel and in fluid communication with the permeate group; and introducing a flow of the seawater into the input retentate port and introducing a permeate liquid medium into at least one input permeate port, wherein the direction of the permeate desalinating liquid medium is counter to the flow of the retentate seawater and effectuating, under pressure from between about 100 psi and about 1000 psi, a sufficient flow of the seawater comprising water molecules through retentate openings for transfer through the filter membrane and for contact with the permeate flow direction media and/or material and transference of isolated water molecules through the permeate flow direction media or material into the permeate desalinated liquid medium.

The pressure of the seawater feed sufficient to transfer the isolated water molecules into the permeate desalinated liquid medium must exceed the osmotic pressure across the permeate flow direction media or material. For example, in the case of seawater feed with a salinity of 35,000 mg/l, the osmotic pressure could be about 270 psi. As such, pressure sufficient to move the water molecules from such a seawater feed must therefore exceed 270 psi. To produce a substantial flux of isolated water molecules into the permeated liquid medium, substantially more than osmotic pressure needs to be applied to the seawater feed. To produce a substantial flux, the seawater feed is preferably pressurized by a pump that applies pressure of between about 100 psi and about 500 psi.

However, it should be noted that the present invention reduces the pressure required because under the countercurrent crossflow configuration of the present invention the osmotic pressure is assisting the flow of water from the retentate side to the permeate side of the membrane.

It is to be understood that pressures, yields, and flux may vary depending upon some restriction due to buildup of scale and debris. Additionally, it is to be understood that multiple cross-flow filtration units of the present invention may also be configured together in parallel and/or serial formation depending upon the amount and salinity of product water desired. Using a greater number of the cross-flow filtration units of the present invention may be utilized together in series and such combination can be operated at lower pressures and can provide higher purity water. Additionally, or alternatively, such multiple cross-flow filtration units of the present invention may be arranged in parallel configuration to provide increased production capacity.

Other features and advantages of the present invention will be better understood by reference to the drawings and detailed description that follows.

BRIEF DESCRIPTION OF THE FIGURES

FIGS. 9A, 9B and 9C show different representations of the stacking of components of the filter module.

DETAILED DESCRIPTION OF THE INVENTION

Figure 1:
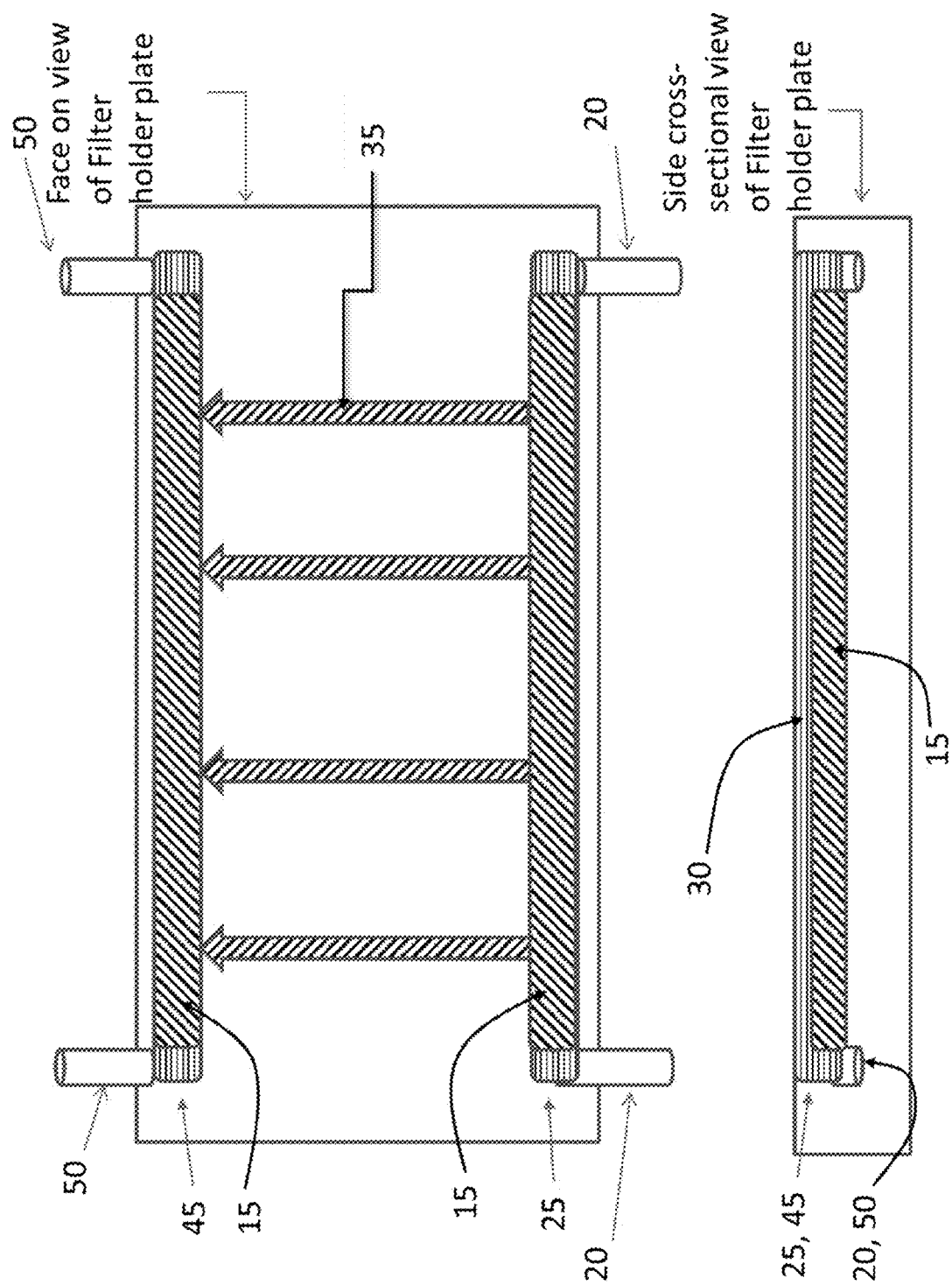
FIG. 1 shows one embodiment of a permeate channel in the end plates having reduced volume of permeate flow due to an insert in the permeate channel.

The system of this present invention provides for the control flow of a permeate fluid into the module at a desired flow and pressure. The permeate fluid is in direct contact with the downstream side of the permeable filter media in such a way as to eliminate the inefficiency of using a filter media support plate that increases the distance required for osmotic or diffusional transfer between the fluids in the retentate and permeate flow paths. Such a system provides for a more efficient osmotic or diffusional transfer of components from the retentate into the permeate stream, or the transfer of components from the permeate fluid into the retentate fluid wherein the direction of the components movement across the permeable filter media is determined by the concentration of the components in the fluid in retentate flow and permeate flow paths. For example if the retentate fluid has a low target ion content and the permeate fluid has a lower target ion content, the target ion molecules in the retentate fluid will diffusively flow through the permeable filter media into the permeate fluid that is contained and directed in the permeate channels. Importantly, the flow into the permeate channels can be in the same direction as that of the retentate flow or in the alternative the flow direction of a fluid into the permeate inlets can be counter to that of the flow of the retentate fluid into the system.

Further, the permeate flow can be directed in a way that is transverse to the direction of flow in the retentate channels. The permeate flow can be directed in a direction that is parallel with the flow in the retentate channels, in a direction that is in the same direction as the retentate flow or in a direction that is opposite of the direction of flow in the retentate channels. The directed permeate flow can be aided by the use of a bias directed permeate directional flow media or any other media, the use of permeate directional flow material in conjunction with a bias permeate directional flow media or any other medias, or by the use of a permeate directional flow material that is interposed between the two downstream sides of the porous filter membrane to create an open permeate channel.

Definitions

In the description of the present invention, certain terms are used as defined below.

"Source liquid" as used herein refers to a liquid containing at least one and possibly two or more target substances, products of value which are sought to be purified from other substances also present. In the practice of the invention, source liquids may for example be seawater, aqueous solutions, organic solvent systems, or aqueous/organic solvent mixtures or solutions. The source liquids are often complex mixtures or solutions containing many biological molecules such as proteins, antibodies, hormones, viruses, bacteria, as well as small molecules such as salts, sugars, lipids, etc.

"Target substance" as used herein refers to the one or more desired product or products to be purified from the source liquid. Target substances are typically isolated water molecules, biological products of value, for example, immunoglobulins, clotting factors, vaccines, antigens, antibodies, selected proteins or glycoproteins, peptides, enzymes, etc. The target substance may be present in the source liquid as a suspension or in solution. For convenience, the term "target substance" is used herein in the singular, but it should be understood that it may refer to more than one substance that is to be purified, either together as co-products or separately (e.g., sequentially) as discrete recovered components.

"Permeate flow directional material" as used herein refers a material selected from the group consisting of polyester, polypropylene, nylon, fluorocarbon polymers such as polytetrafluoroethylene, polyethylene, and polysulfone, and composites comprising one or more of such materials. Use of the permeate flow directional material downstream in the permeate space provides for the inclusion of permeate openings or channels (160) running the length of the sheet similar to the openings in the retentate side of the module and such permeates sheets provide for a flow of permeate fluid through the permeate openings and in some instances the elimination of the need for a sheet of permeate flow directional media because the permeate space is kept from being blocked by the compression of the membranes due to the filling of the permeate opening with the noncompressible fluid.

"Permeate flow directional media" as used herein refers to a woven fabric that provides for a directional flow of fluid along the surface or within grooves of the fabric, wherein the fabric has flow channels (120) formed by the weave. The fabric may be selected from the group consisting of polyester, polypropylene, nylon, fluorocarbon polymers such as polytetrafluoroethylene, polyethylene, and polysulfone, and composites comprising one or more of such materials.

"Bonded" as used herein refers to securing adjacent sheets or endplates in such manner as to prevent flow of the material being processed, e.g., the feed material to be separated, as well as component materials therefrom (filtrate or permeate, as well as retentate), from flowing through such secured areas or between the adjacent sheets at such secured areas. Preferably, the bonding is carried out with a suitable adhesive or sealant medium, e.g., a urethane, epoxy, cyanoacrylate, or silicone adhesive material which adhesively joins one of the adjacent sheets to the other in the bonded areas.

"Compressive bonding" and "compressively bonded" refer to bonding and bonding operations in which the structure being bonded is subjected to a compressive load or force, for sufficient time and under sufficient period to effect the bonding securement of the structure.

The term "cross-flow filtration cassette" refers to a type of filter module or filter cassette that comprises a porous filter element across a surface of which the liquid medium to be filtered is flowed in a tangential flow fashion, for permeation through the filter element of selected component(s) of the liquid medium. In a cross-flow filter, the shear force exerted on the filter element (separation membrane surface) by the flow of the liquid medium serves to oppose accumulation of solids on the surface of the filter element. Cross-flow filters include microfiltration, ultrafiltration, nanofiltration, reverse osmosis, and forward osmosis systems. Cross-flow filter modules and cross-flow filter cassettes useful for such filtration are commercially available from Smartflow Technologies, Inc. (Apex, N.C.). Suitable cross-flow filter modules and cassettes of such types are variously described in the following U.S. Pat. Nos. 4,867,876; 4,882,050; 5,034,124; 5,034,124; 5,049,268; 5,232,589; 5,342,517; 5,593,580; and 5,868,930; the disclosures of all of which are hereby incorporated herein by reference in their respective entireties.

The term "sheet" will denote the generally planar members of the cassette, the cassette thus comprising an assembly of permeate sheets, filter sheets, and retentate sheets, coupled to one another in such manner as to permit flow of the fluid to be separated through the flow channel(s) of the device, for mass transfer involving passage of the permeate through the filter sheets, and retention of the retentate on the side of the filter sheet opposite the side from which the permeate emerges.

The filter membrane sheets used in the present invention may be of any suitable materials, such as a material selected from the group consisting of polymers, such as polypropylene, polyethylene, polysulfone, polyethersulfone, polyetherimide, polyimide, polycarbonate, polyvinylchloride, polyester, etc.; nylon, silicone, urethane, cellulose nitrate, cellulose acetate, regenerated cellulose, polyether amide, polyphenylene oxide/polysulfone blends, mixed esters of cellulose, polyether sulfone and composites of such materials.

The filter membrane sheets used in the present invention may be of any suitable porosity rating. As used herein, the porosity rating of a sheet of filter material is the smallest particle size which cannot pass through the pores of the filter material. Typical porosity ratings are expressed in molecular weight (MW), solute rejection or retention efficiencies, and micrometer units, e.g., a 2 micron filter media sheet being a material which will pass particles smaller than 2 microns in diameter through the pores of the material, while particles larger than 2 microns will not be passed through the filter material, and as a further example, a 10,000 MW filter media sheet being a material which will pass particles smaller than 10,000 MW in diameter through the pores of the material, while particles larger than 10,000 MW will not be passed through the filter material. Where solute rejection or retention ratings are used a percentage of the named solute that is used as an indicator of efficiency (NaCl, Mg $SO_4$, glucose, or detran for example) is retained by the filter media under specific conditions. Thus, a skilled artisan will determine the applicable porosity sizing of the membrane for the particular use of the filtration system. Preferably, the pore rating will range from about 99.9% to about 20% rejection of NaCl but larger pore sizes are contemplated and applicable for separation of larger molecules.

The end plates used with the present invention may be formed of any suitable materials of construction that provide structural integrity and does not interact with the source solution, including polymers such as polypropylene, polyvinylchloride, silicon, polyethylene, polycarbonatepolysulfone, and polyetherimide. Preferably the endplates have a dimension wherein the length of each endplate is greater than the width of such endplate, and thereby providing for an elongated unit and internal elongated channels for flow of fluids through the unit. The endplates may be connected by clamps or removable screws positioned along the outer perimeter of the endplate and applicable for easy opening of the unit.

Each rigid endplate comprises inlet and outlet ports for both the introduction and removal of the retentate liquid source and the permeate liquid source. The ports can be bored at either a 90 degree angle or beveled towards each other for easy flow of fluids therethrough. The ports may be fabricated to receive connectors or valves as either screw-in or pop-in types. Further, the inlet and outlet ports may comprise fittings including luer-locks, hose barbs or triclamps. Still further, the inlet and outlet ports can be sized to increase or reduce fluid into the system or removal thereof.

The above-described filtration cassette of the invention comprises a "base sequence" of elements, defined as a sequence of sheet elements constituting a retentate sheet (hereafter designated by the symbol "R"), a filter sheet (hereafter designated by the symbol "F"), a permeate sheet (hereafter designated by the symbol "P"), wherein the permeate sheet may comprise at least one member selected from the group of a permeate flow directional material or permeate flow directional media, a second filter sheet ("F"), and a second retentate sheet ("R"), thereby providing a sequence of sheet elements, R/F/P/F/R.

The base sequence of sheet elements may be utilized in construction of filters comprising a plurality of filtration cassettes, wherein an illustrative stacked cassette filter according to the invention may for example feature the sheet sequence R/F/P/F/R/F/P/F/R/F/P/F/R. In all repetitive sequences, other than a single cassette base sequence, the following relationship is observed: where X is the number of filter sheets F, the quantity $0.5X-1$ is the number of retentate sheets R, and the quantity $0.5X$ is the number of permeate sheets P, with two retentate sheets being utilized to seal the top and bottom extremities of the intervening sequence.

Thus, it is possible to utilize a large number of base sequence cassettes in a repetitive sequence, to provide a stacked cassette filter of the desired mass transfer area. Many configurations are possible. It is feasible in some instances, e.g., for mass transfer studies and system quantitation, to utilize a single cassette comprising the base sequence R/F/P/F/R wherein the outermost retentate sheets in the sequence are compression-sealed at their outer faces to an end plate.

In one preferred embodiment of the cassette article of the present invention, a retentate sheet is provided with a plurality of transversely spaced-apart, longitudinally extending ribs or partitions, extending upwardly from (the central portion of) each of the main top and bottom faces of the retentate sheet, such ribs or partitions being of substantially the same height and substantially parallel to one another to define a series of channels (150) between the partitions, extending longitudinally between the respective basin openings of the retentate sheet, on both faces thereof. The adjacent filter sheets may be further bonded to the outer extremities of the ribs or partitions, and the ribs or partitions may be formed of any suitable material, e.g., a flexible resilient adhesive bonding medium, such as a urethanes, epoxy or silicone adhesive sealant medium, e.g., applied in a "bead" in the longitudinal direction of the retentate sheet on both main top and bottom faces thereof.

Furthermore, it is possible to optimize the separate processes with cross-flow filtration modules of variable channel velocities but of uniform channel heights, given the fact that most commercial cross-flow modules are only available in a single channel height. When the channel height of a cross-flow filtration module is known, shear is directly proportional to channel velocity of such module for the same solution passing by.

In the literature, numerous techniques have been proposed to effect the separation of target substances using membrane separations with addition of foreign substances such as acid, base, salt and solvents. In contrast to these chemical additives-based methods, the methodology of the present invention permits a target substance to be separated from an input fluid by the simplest mechanical means. In the use of cross-flow filtration modules of the type described in the aforementioned patents, the specificity and speed of a desired separation is effected by a) fluid distribution in the cross-flow module, b) channel height of the cross flow module, c) channel length, d) shear rate, e) membrane pore structure, f) membrane structure, g) membrane chemistry, h) trans-membrane pressure, and i) pressure drop, which is a function of channel length, velocity and solution viscosity.

The approaches by others involving various additives and manipulations of transmembrane pressure appear to be predicated on overcoming problems created by poor distribution of flow within the cross-flow module. It is not to say that the addition of salts and solvents do not have a place in separation but without proper flow distribution the membrane separation cannot be optimally operated nor will cleaning techniques be fully beneficial. It will be appreciated, based on the disclosure herein that numerous heretofore expensive or difficult separations are rendered far simpler and more economical by employing the techniques described herein.

Thus, the invention relates in another aspect to optimizing the membrane separation process, comprising:

selecting a cross-flow membrane module wherein the distance from the inlet port to the outlet port is equidistant from the inlet to outlet for each sub-channel of the device, i.e., each sub-channel is of a same dimensional character;

selecting an optimal channel height;

selecting an optimal shear rate and/or channel velocity;

selecting an optimal transmembrane pressure;

selecting an optimal membrane pore size;

selecting an optimal temperature;

selecting an optimal channel length; and selecting an optimal pressure drop which is the composite of the optimal channel height;

the optimal shear rate and/or channel velocity;

optimal channel length; and the viscosity of the solution being filtered.

Selecting a channel height can be performed mathematically or empirically by trial and error. In most cell fermentation applications, trial and error has been more appropriate due to the fact that the viscosity of the cell broth or product solution is rarely known, the cell count and cell viability are highly variable, and the solution is frequently non-Newtonian. The objective of channel selection is to minimize channel height with three critical stipulations: first, the channel must be sufficiently high to allow the unrestricted passage of any larger material such as clumped cells; second, the channel should not cause excessive pressure drop and loss of linear efficiency; and third, the channel should be sufficiently high as to allow the proper angle of attack for substances to encounter the membrane pore and pass through the pore. The optimal channel height is dependent on the length and viscosity of the solution.

It will be appreciated that the filtration unit of the present invention may be variously fabricated, utilizing foraminous material, e.g., screen or mesh, or rigid sheets in its construction, the choice of a specific type component sheet being readily determinable for a given end use application of the invention.

Notably, in one embodiment the inlet and outlet ports of the filtration unit may be devoid of sharp corners, so that any intersecting linear surfaces converge at a rounded or curvate corner which includes the possibility of angled ports. Such configuration assists the hydrodynamic characteristics of the unit. The advantage of the filtration unit of the present invention provides for high flow velocities of the source solution between the inlet and the outlet of the retentate endplate. This prevents the formation of deposits, for example, in the form of a filter cake, since there are no dead zones for the flow medium flowing through the longitudinal channel. The source solution can essentially flow without deflection from the inlet to the outlet of the device.

Figure 2:
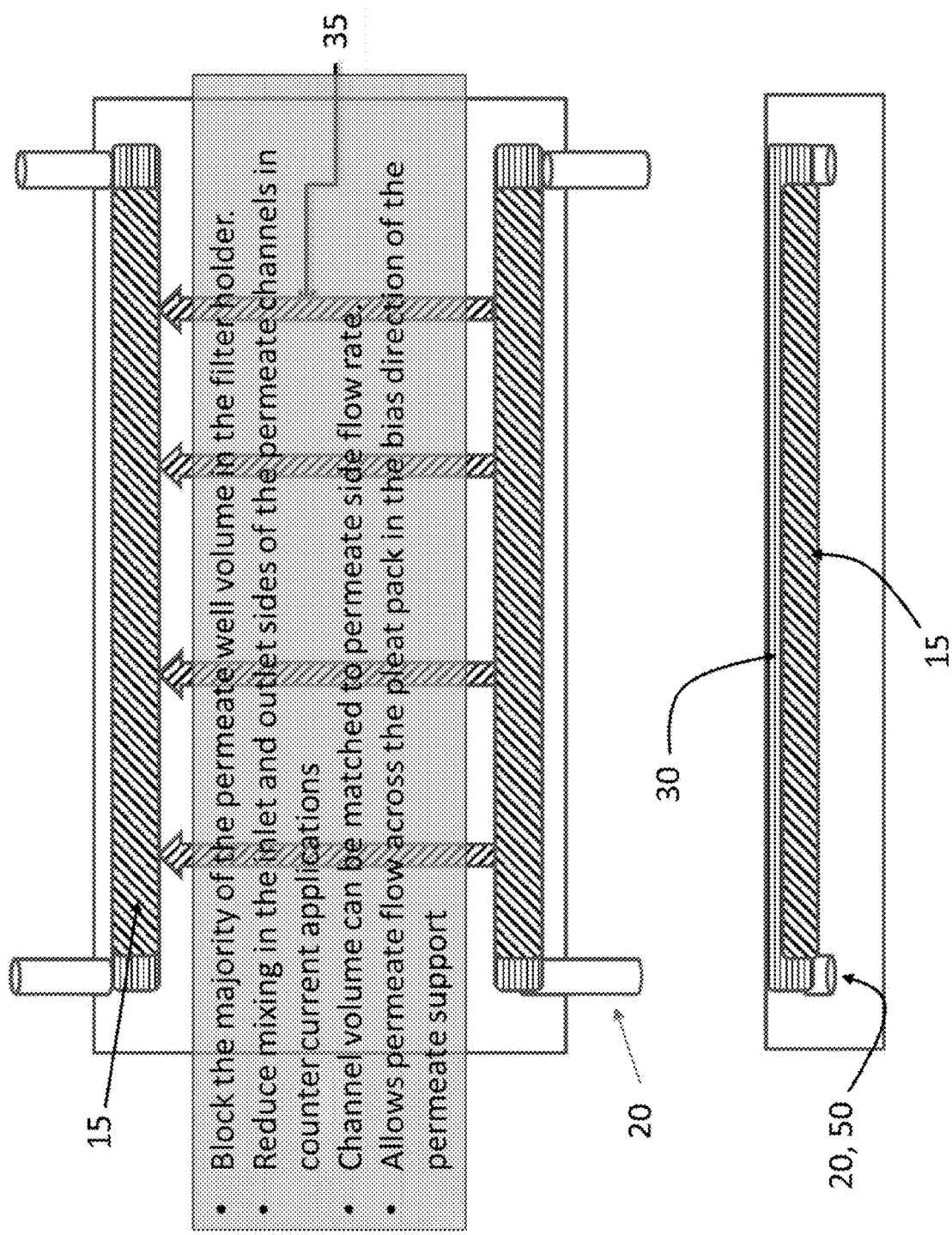
FIG. 2 shows the direction of flow of the permeate liquid after pumping into the permeate ports.

FIGS. 1 and 2 show the reduction of the depth of the permeate channels (25, 45) in the filter holder with an insert (15) or a manufacturing change to significantly reduce the depth, and therefore the volume, of the full length permeate evacuation channels (25, 45) in the filter holder. The flow into the inlet permeate port(s) (20) surpasses the flow of fluid that can flow through the permeate channel (25) and thus the permeate flow (35) is forced to flow across the permeate flow direction media to flow out of the outlet permeate channels (45) into the permeate outlet ports (50). The reduced depth, and subsequently reduced volume of the permeate channels (25, 45) in the holder, will reduce mixing in the permeate channels in the holder and allow smaller volumes of the permeate components to be used to drive the exchange of components in the retentate channels in the filter module with the permeate fluid in the permeate channels (25, 45) in the filter modules, for example osmotic pressure assisted membrane flux and also increase the detectability of more subtle changes in the permeate solution stream that occur as a result of the differences in the fluid composition of the fluid in the retentate channels and the fluid composition of the fluid in the permeate channels in the filter module. It will allow more precise measurement of the changes in the permeate.

Figure 3:
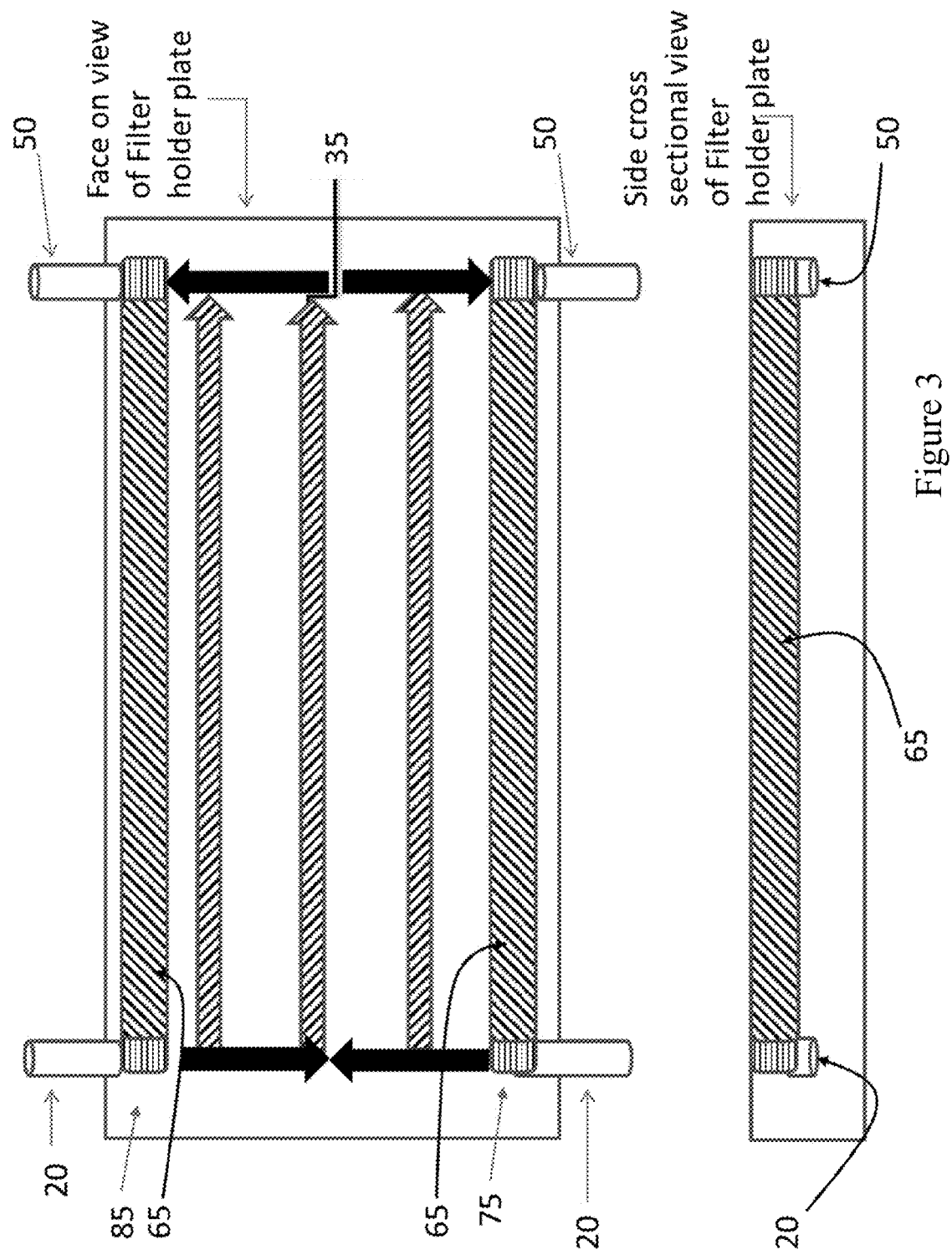
FIG. 3 shows another embodiment of a permeate channel, wherein the permeate channel is blocked and permeate liquid introduced into the inlet ports enters directly onto the surface of the permeate flow directional media or material.
Figure 4:
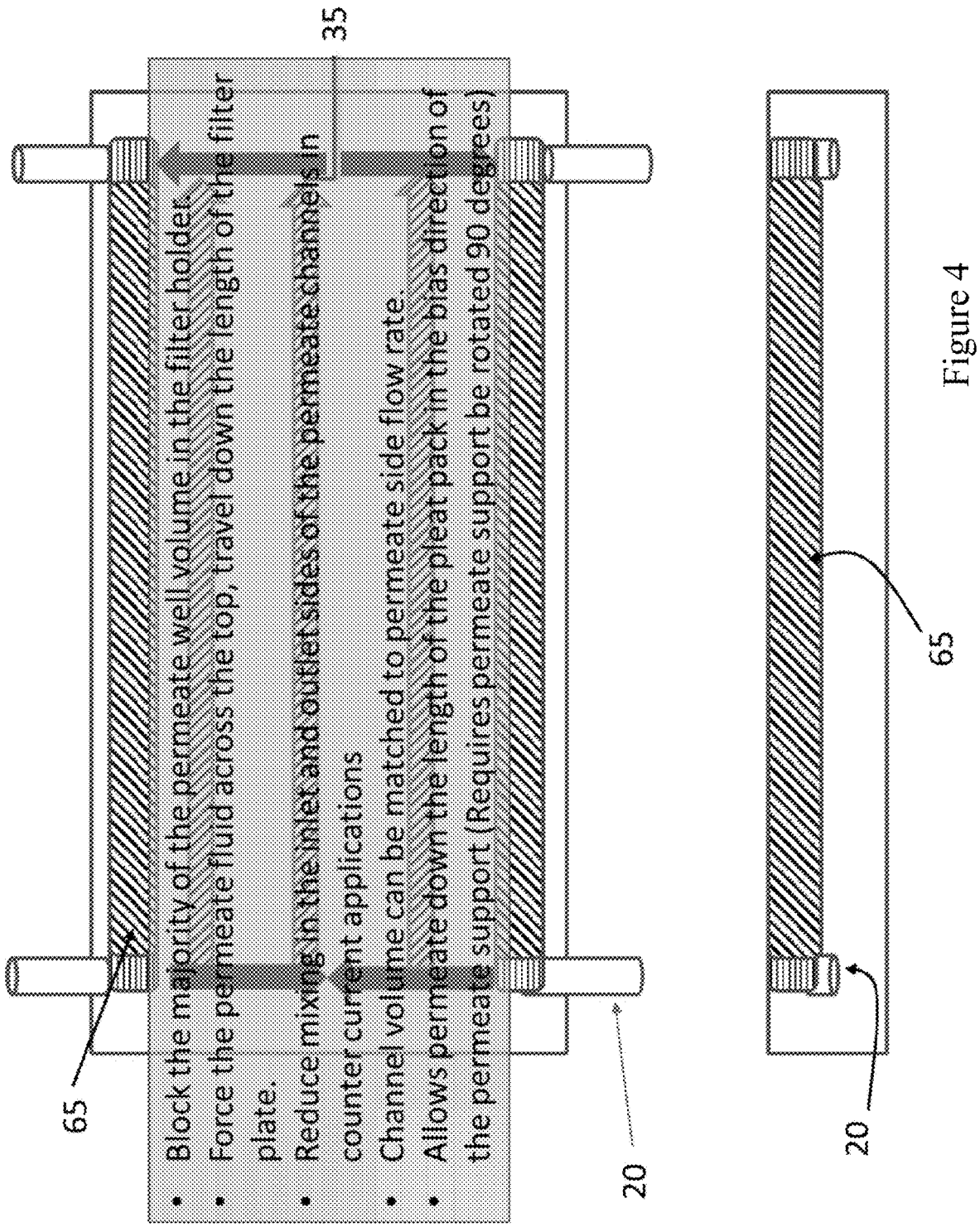
FIG. 4 shows the direction of flow of the permeate liquid after pumping into the permeate ports.

FIGS. 3 and 4 show the permeate collection channels (25, 45) of the filter holder being completely blocked (65) between the permeate inlet (20) and outlet ports (50). This will force the pumped permeate inlet side solution to travel longitudinally over the length of the permeate pack from the two inlet ports (20) at the end nearest the retentate outlet (130) of the filter holder to the outlet ports (50) at the end nearest the retentate inlet (140) of the holder. This creates a counter current state between the top or retentate outlet (130) and pumped permeate inlet of the module and the bottom of the module or the retentate inlet (140) and the pumped permeate outlet. The countercurrent state is established with the concentration of the target substance, such as an ionic species, being high at the inlet of the retentate port (140) and getting progressively lower as the retentate travels through the retentate flow channel and the (molecule(s)) ionic species is transported through the membrane. The opposite occurs for the pumped permeate solution, the solution containing the counter ion (or molecule, or solution devoid of ions) concentration is highest at the inlet permeate flow port (20) and lowest as the permeate flow reaches the permeate outlet port (50) due to the dilution of the fluid in the permeate stream from the fluid passing through the porous filter media from the retentate channel to the permeate channel. The target substance concentration difference will enable enhanced ion or other target molecule passage from the retentate channels to the permeate channels (25, 45) in the module through the filter media. The relative concentrations of target substance will always be higher than the counter ion in the immediate interface of the membrane surfaces. With appropriate flow rates set for the retentate and permeate streams, the flow of the retentate and permeate solutions maintains the dynamic environment at the membrane surface and does not allow the species to equilibrate, therefore there is always a driving ionic/osmotic force to aid in target substance passage.

Fluid can also be pumped in the reverse direction in a separate embodiment of the design so the flow of the permeate fluid is the same direction of flow as the fluid in the retentate path.

Figure 5:
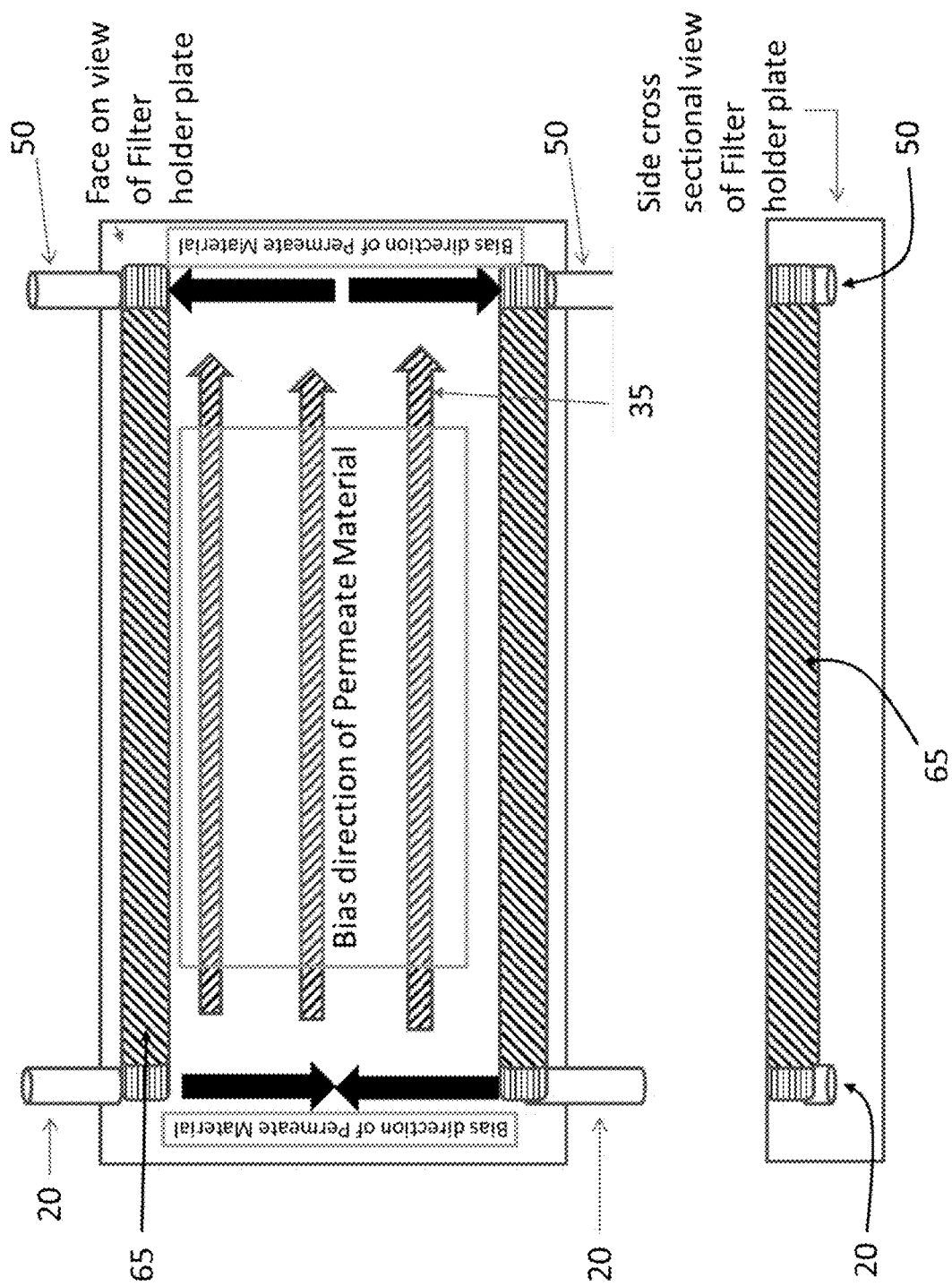
FIG. 5 shows the direction of fluid when a woven fabric is positioned on the bias and providing flow channels in the woven material.
Figure 11:
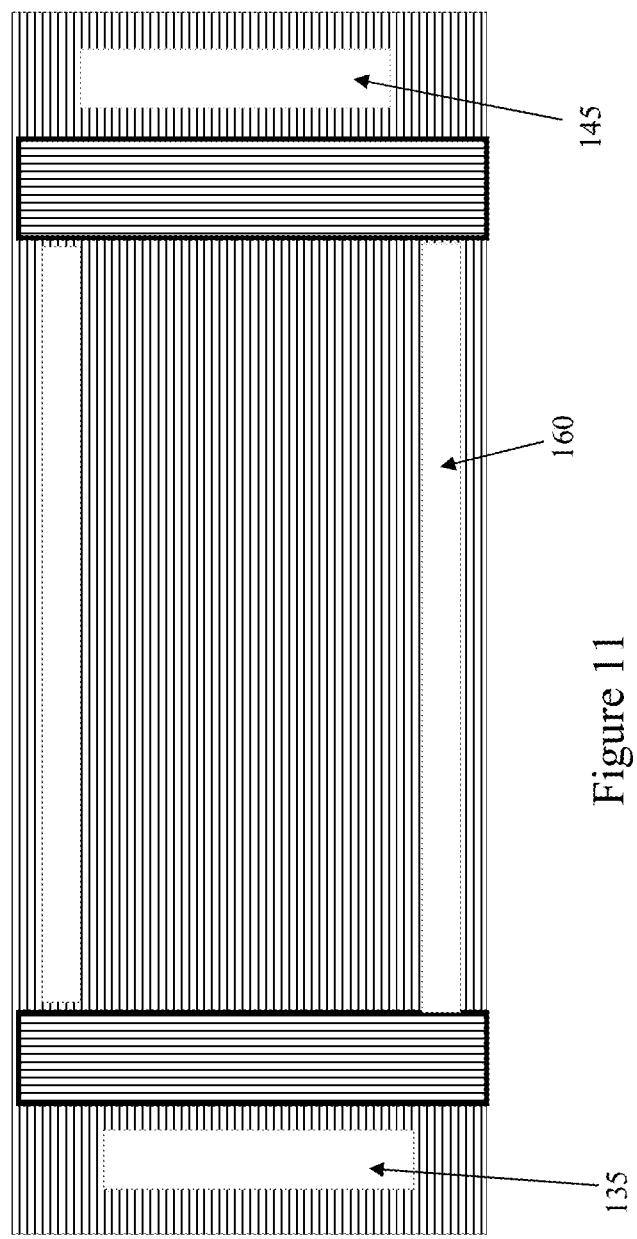
FIG. 11 shows a possible fabrication of the permeate directional flow media to provide directional flow.

FIG. 5 shows an example of the use of a specific permeate flow direction media that more efficiently direct this flow. In one embodiment, a bias thread is oriented to direct the permeate flow longitudinally through the flow direction media which is in direct contact with the downstream sides of the permeable membrane. If an improved transverse flow path at the inlet (20) and outlet (50) areas is required, a section of permeate flow direction media can be incorporated in a transverse orientation to selectively direct flow laterally in the inlet and outlet regions. Thus, the permeate flow direction media can be specifically fabricated to direct the flow of the permeate solution in the desired direction, as shown in FIG. 11.

Figure 6:
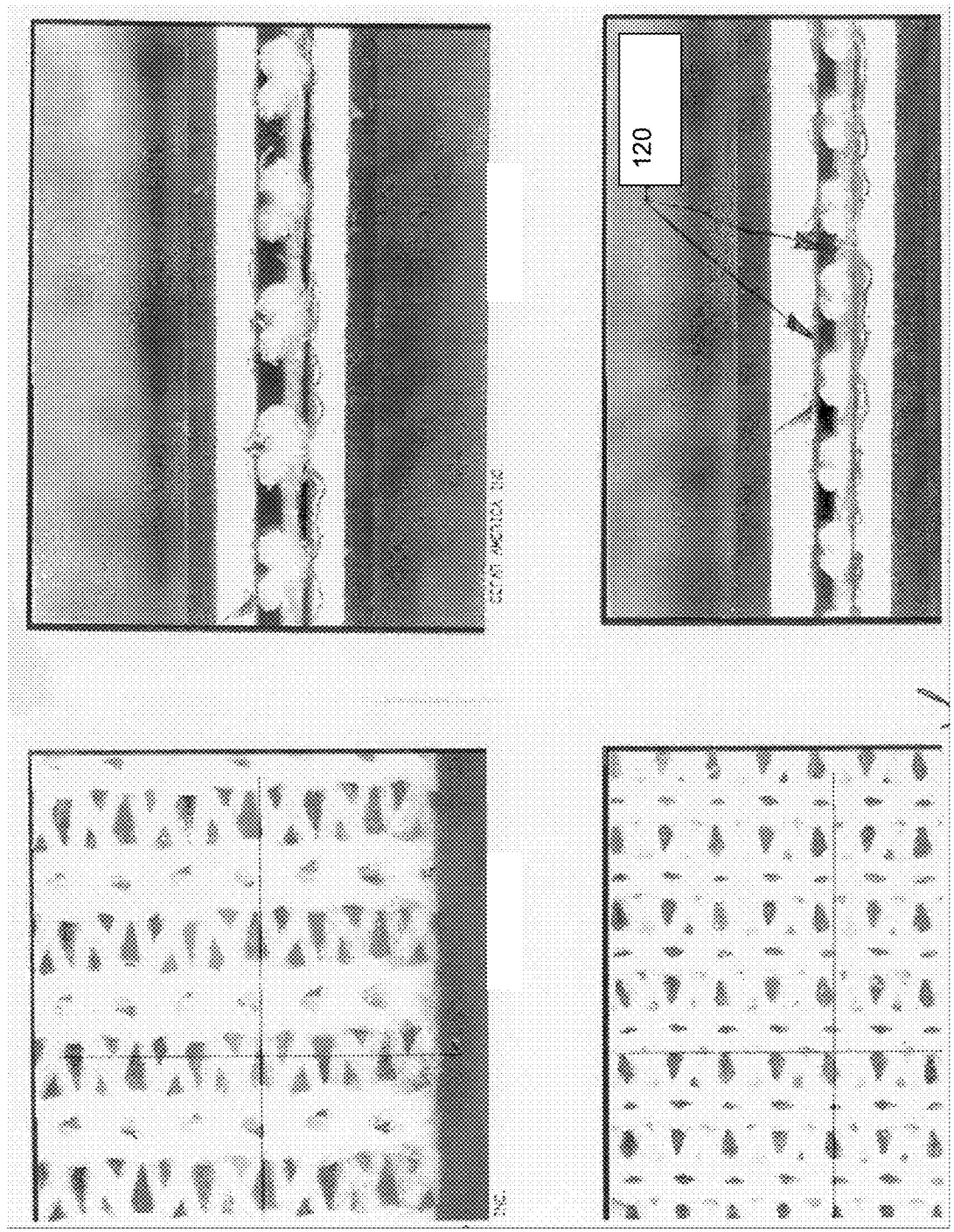
FIG. 6 shows woven fabric that provides for directional flow of permeate liquid.

FIG. 6 provides an illustration of a woven fabric that can be used to fabricate the permeate flow direction media wherein the flow channels formed by the construction of the media (twill, is an example, but not the only embodiment) weave can be oriented to provide flow channels (120) for enhancing flow over the permeate flow direction media in the preferred direction. This is a single example, not a complete or exhaustive list of potential media that can be used to create a permeate flow direction media used in this invention.

Figure 7:
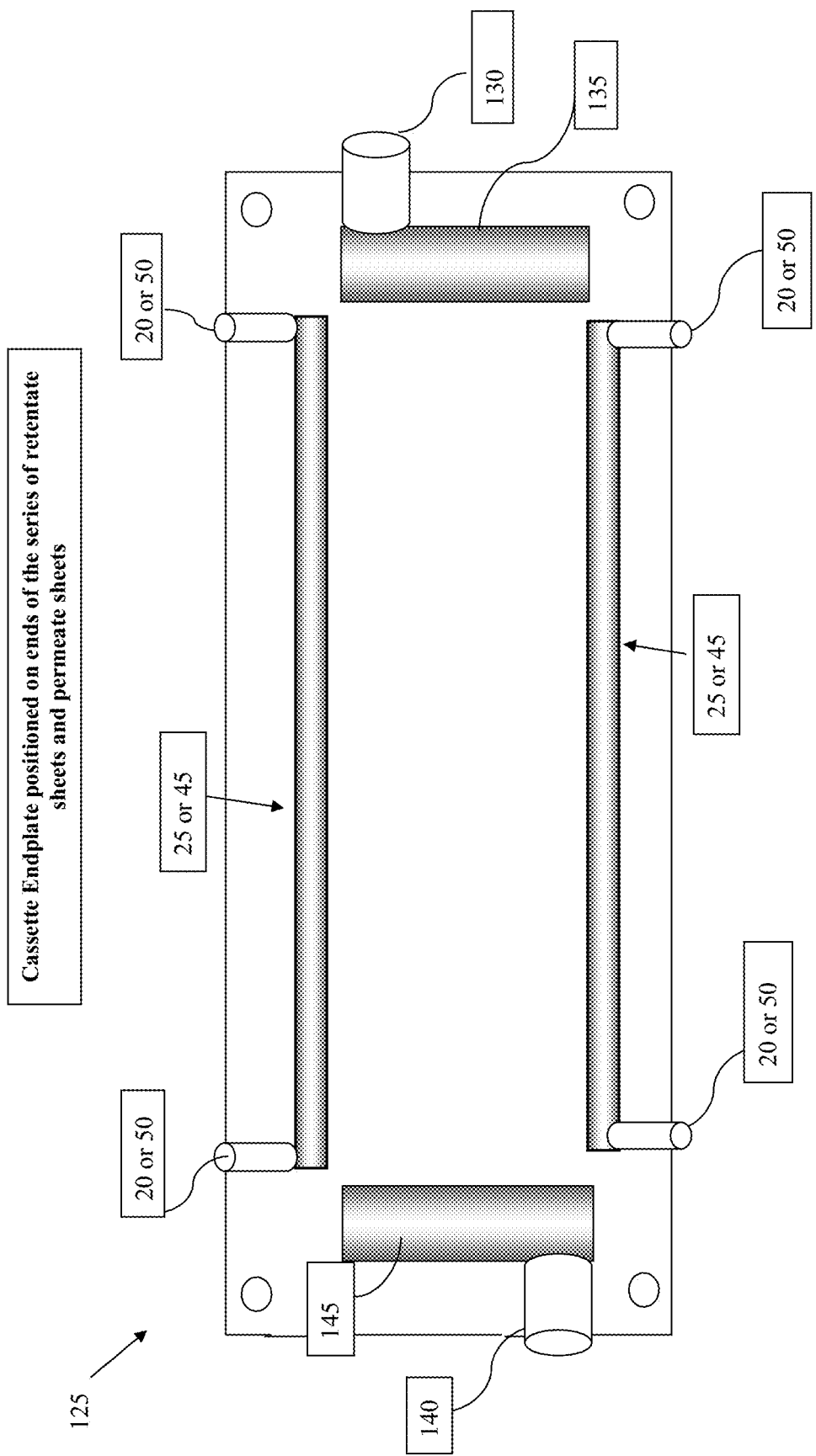
FIG. 7 shows placement of channels and inlet or outlet ports on a filter endplate of the present invention.

FIG. 7 provides an illustration of a filtration module holder (125) usable with the filtration module of the present invention. The permeate channels (25,45) in the holder can be adjusted for size to reduce or restrict flow of the permeate fluid.

Figure 8A:
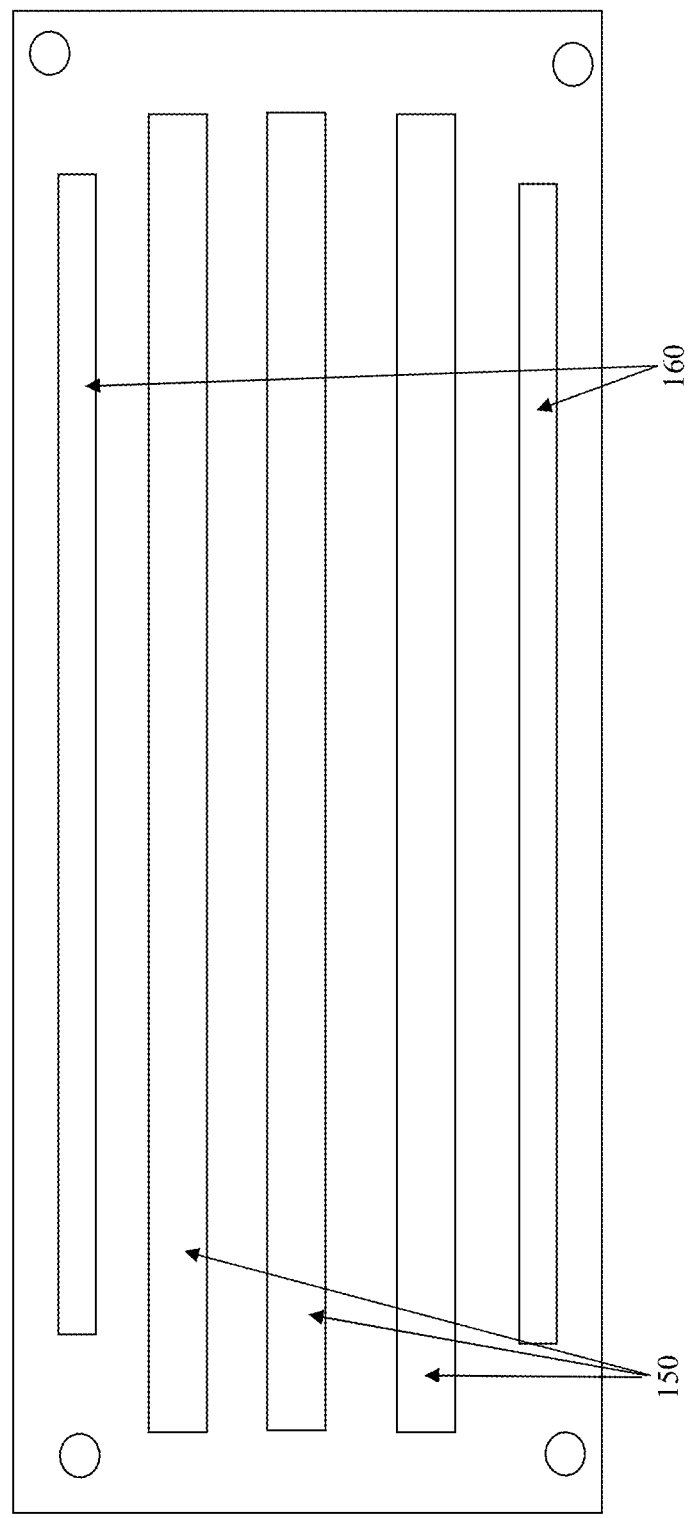
FIGS. 8A and 8B show illustrations of a retentate sheet and an embodiment of a permeate flow directional material sheet.

FIG. 8A shows a retentate sheet wherein retentate flow is introduced via the retentate channel to allow the flow of a fluid to pass through the retentate flow passages (150) for contact of the retentate fluid with permeable filter membrane. Although the retentate sheet permeate channels (160) in this figure are shown fully open, they can be altered to reduce or restrict flow.

Figure 8B:
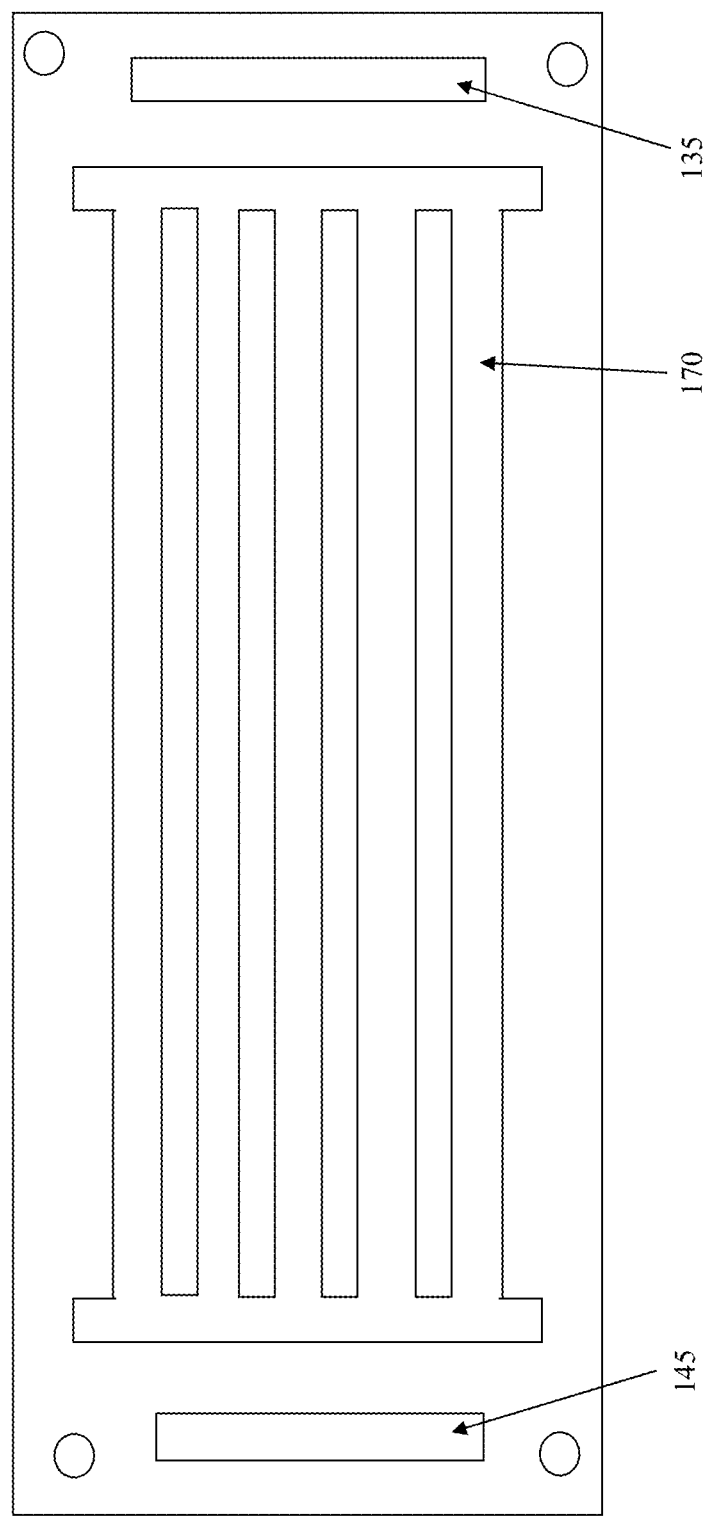

FIG. 8B shows one embodiment of a permeate direction flow material wherein permeate flow is directed longitudinally through the permeate flow space for contact of the permeate fluid with the downstream surface of the permeable filter membrane. Again although the permeate channels (170) in the permeate directional flow material are shown fully open, they can be altered to reduce or restrict flow. The permeate directional flow material may be positioned to be in contact with the permeate directional flow media, if one is used, or with the downstream side of the permeable filter membrane directly if a permeate directional flow media is not used. In both instances the permeate directional flow material will direct the flow of the permeate fluid longitudinally along the filter media downstream side. The thickness of the permeate directional flow material can be altered to increase, reduce or restrict flow and effect the efficiency of the diffusional or osmotic transfer through the permeable filter membrane.

FIG. 9A provides a representation of the stacking of components of the module where the permeate directional flow media (174) only is used. FIG. 9B provides a representation of the stacking of the components of a module incorporating the permeate directional flow material (176) to direct flow of the permeate fluid through the permeate flow direction media (174). FIG. 9C provides a representation of the stacking of components of the module where the permeate directional flow material (176) only is used.

Figure 10:
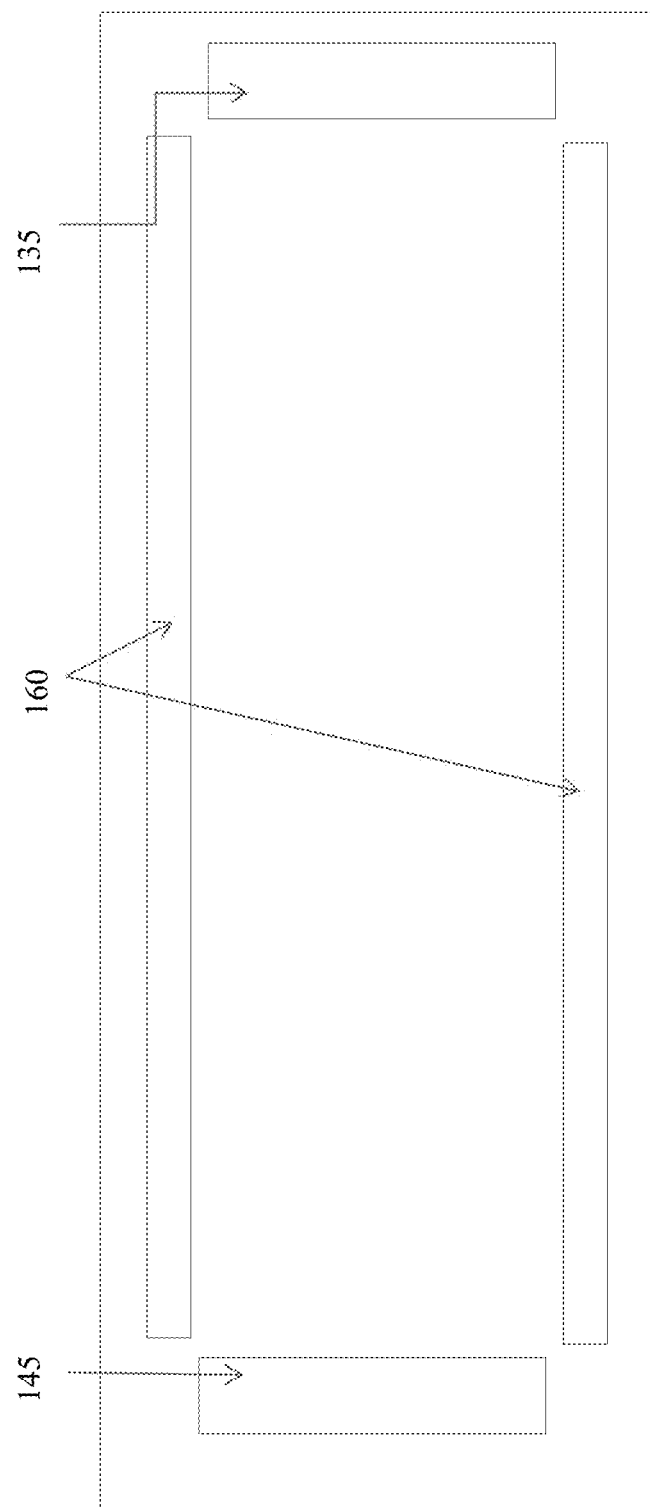
FIG. 10 shows a filter sheet wherein one of such sheets is positioned on each side of the permeate flow direction media.

FIG. 10 shows a filter sheet wherein one of such sheets is positioned on each side of the permeate flow direction media. The permeate channels (160) are adjusted to reduce, increase or restrict flow to provide the necessary flow direction.

FIG. 11 provide a possible fabrication of the permeate directional flow media to provide directional flow.

Figure 12:
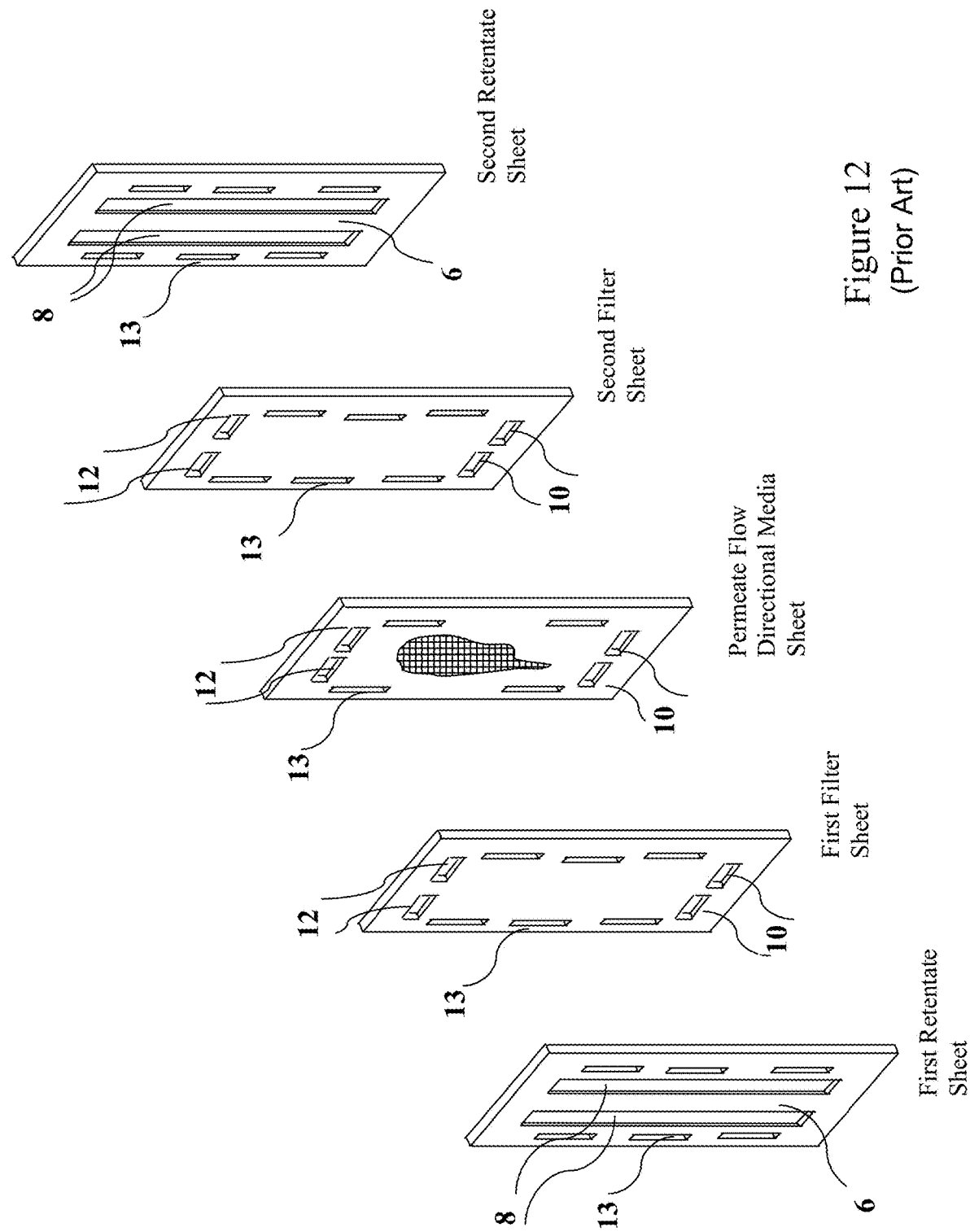
FIG. 12 shows an alternate representation of the stacking of components of the module incorporating permeate directional flow media to direct the path of the permeate.

FIG. 12 provides an alternate representation of the stacking of components of the module incorporating permeate directional flow media to direct the path of the permeate and comprises the following sheet members:

a. a first retentate sheet of suitable material, e.g. polysulfone, polyethersulfone, polycarbonate, urethane, silicone, or other compressible material of construction, having (i) at least one longitudinally extending rib or partition element 6, such partition element(s) when provided in multiple configuration being transversely spaced apart from one another and being of substantially the same height and substantially parallel to one another to define a single or a series of channels 8 between the partitions, extending longitudinally between the respective retentate inlet 10 and retentate outlet 12 basin openings of associated filter elements and permeate sheet members, on both faces thereof, (ii) permeate passage openings 13 at side portions of the sheets, and (iii) the retentate sheet aligned to the first sheet of filter material at respective end and side portions thereof, with the basin openings and permeate passage openings of the associated sheet members in register with one another and the permeate passage opening of the retentate sheet member being circumscribingly compressed to the first sheet of filter material, and with a central portion of the first sheet of filter material and the retentate sheet member being unbonded to permit permeate contacting the retentate sheet member to flow through the first sheet member of filter material to the foraminous permeate sheet member;

b. a first sheet member of filter material having (i) multiple basin openings, of a suitable shape, e.g., polygonal, semi-circular, or sector shape, at each of opposite end portions of the sheet member defining respective retentate inlet 10 and retentate outlet 12 passages, each basin being bounded by generally linear side edges defining corners of the basin at respective intersections of the side edges, and (ii) permeate passage openings 13 at the side portions of the sheet member, wherein the first sheet member of filter material is bonded to the permeate flow directional media sheet member at their respective end and side portions, with their basin openings and permeate passage openings in register with one another and the basin openings being circumscribingly bonded at respective end portions of the first sheet member of filter material and the permeate flow directional media sheet member, and with a central portion of the first sheet member of filter material and the permeate flow directional media sheet member being unbonded so as to define a central portion of the permeate flow directional media sheet communicating with the permeate passages in the first sheet member of filter material and in the permeate flow directional media sheet member;

c. a permeate flow directional media sheet member of screen or mesh media and preferably the media is constructed of a woven fabric that provides for channels for flow of the permeate liquid, wherein the sheet has (i) multiple basin openings of suitable shape at each of opposite end portions of the sheet member defining respective retentate inlet 10 and retentate outlet 12 passages, each basin being bounded by generally linear side edges defining corners of the basin at respective intersections of the side edges, and (ii) permeate passage openings 13 at the side portions of the sheet member;

d. a second filter sheet as defined above; and e. a second retentate sheet as defined above and sealed to the second filter sheet.

Figure 13:
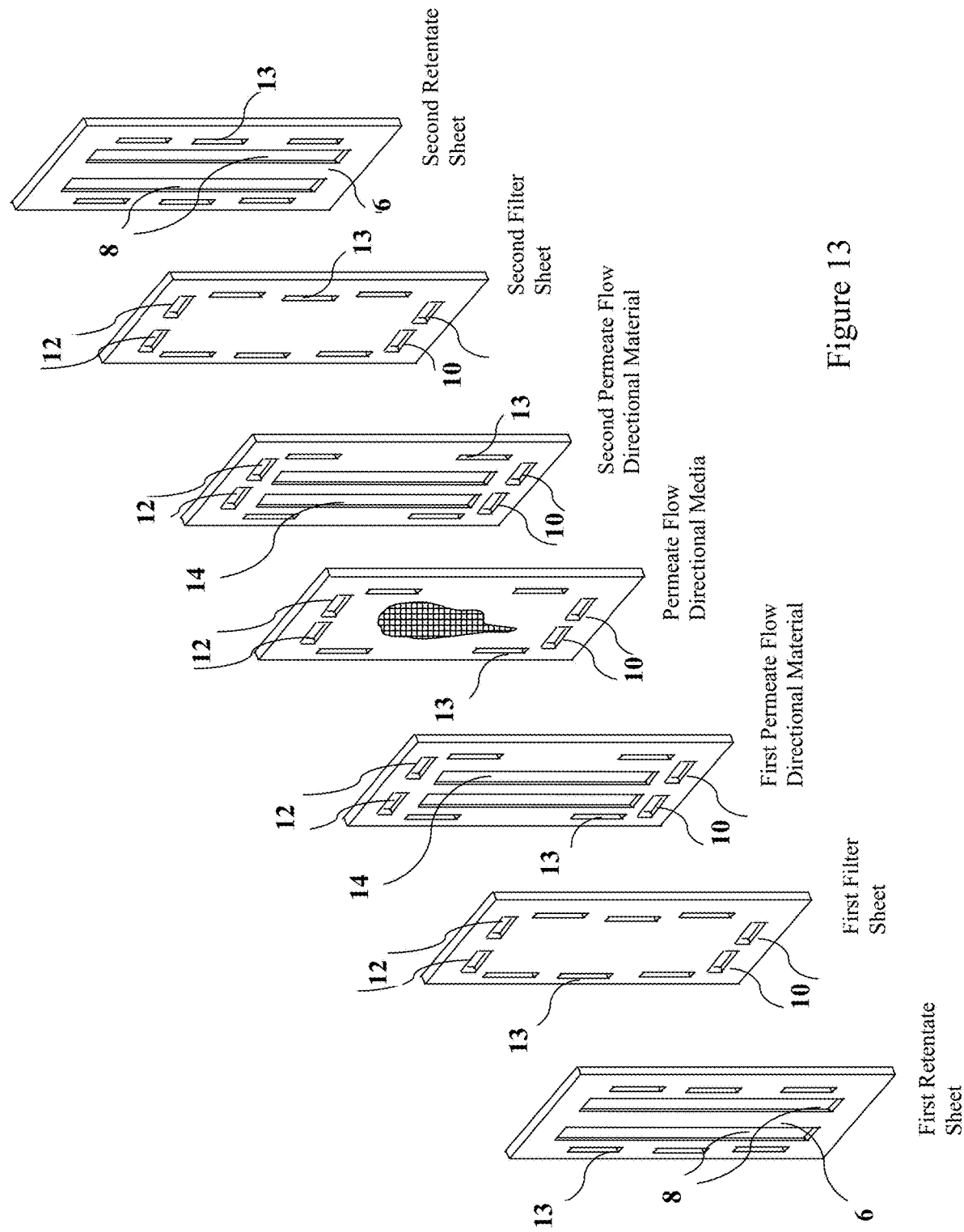
FIG. 13 shows an alternate representation of the stacking of components of the module incorporating permeate directional flow material flow channels and the permeate flow direction media to direct the flow of the permeate fluid.

FIG. 13 describes a system that includes the use of two different types of permeate sheets and defined as permeated flow directional material and permeated flow direction media, the system comprises:

a. a first retentate sheet of suitable material, e.g. polysulfone, polyethersulfone, polycarbonate, urethane, silicone, or other compressible material of construction, having (i) at least one longitudinally extending rib or partition element 6, such partition element(s) when provided in multiple configuration being transversely spaced apart from one another and being of substantially the same height and substantially parallel to one another to define a single or a series of channels 8 between the partitions, extending longitudinally between the respective retentate inlet 10 and retentate outlet 12 basin openings of associated filter elements and permeate sheet members, on both faces thereof, (ii) permeate passage openings 13 at side portions of the sheets, and (iii) the retentate sheet aligned to the first sheet of filter material at respective end and side portions thereof, with the basin openings and permeate passage openings of the associated sheet members in register with one another and the permeate passage opening of the retentate sheet member being circumscribingly compressed to the first sheet of filter material, and with a central portion of the first sheet of filter material and the retentate sheet member being unbonded to permit permeate contacting the retentate sheet member to flow through the first sheet member of filter material to the foraminous permeate sheet member;

b. a first sheet member of filter material having (i) multiple basin openings, of a suitable shape, e.g., polygonal, semi-circular, or sector shape, at each of opposite end portions of the sheet member defining respective retentate inlet 10 and retentate outlet 12 passages, each basin being bounded by generally linear side edges defining corners of the basin at respective intersections of the side edges, and (ii) permeate passage openings 13 at the side portions of the sheet member, wherein the first sheet member of filter material is bonded to the permeate flow directional media sheet member at their respective end and side portions, with their basin openings and permeate passage openings in register with one another and the basin openings being circumscribingly bonded at respective end portions of the first sheet member of filter material and the permeate flow directional media sheet member, and with a central portion of the first sheet member of filter material and the permeate flow directional media sheet member being unbonded so as to define a central portion of the permeate flow directional media sheet communicating with the permeate passages in the first sheet member of filter material and in the permeate flow directional media sheet member;

c. a permeate flow directional material sheet member of e.g. polysulfone, polyethersulfone, polycarbonate, urethane, silicone, or other compressible material of construction have openings 14 for flow of the introduced permeate liquid medium, the sheet also has (i) multiple basin openings of suitable shape at each of opposite end portions of the sheet member defining respective retentate inlet 10 and retentate outlet 12 passages, each basin being bounded by generally linear side edges defining corners of the basin at respective intersections of the side edges, and (ii) permeate passage openings 13 at the side portions of the sheet member, such sheet member can also act as a spacer to reduce any contact of the filter sheet with an adjacent permeate flow directional media sheet;

d. a permeate flow directional media sheet member of screen or mesh media as described above and preferably the media is constructed of a woven fabric that provides for channels for flow of the permeate liquid, a second filter sheet as defined above; and e. a second permeate flow directional material sheet as described above;

f. a second filter sheet as defined above; and g. a second retentate sheet as defined above and sealed to the second filter sheet.

Figure 14:
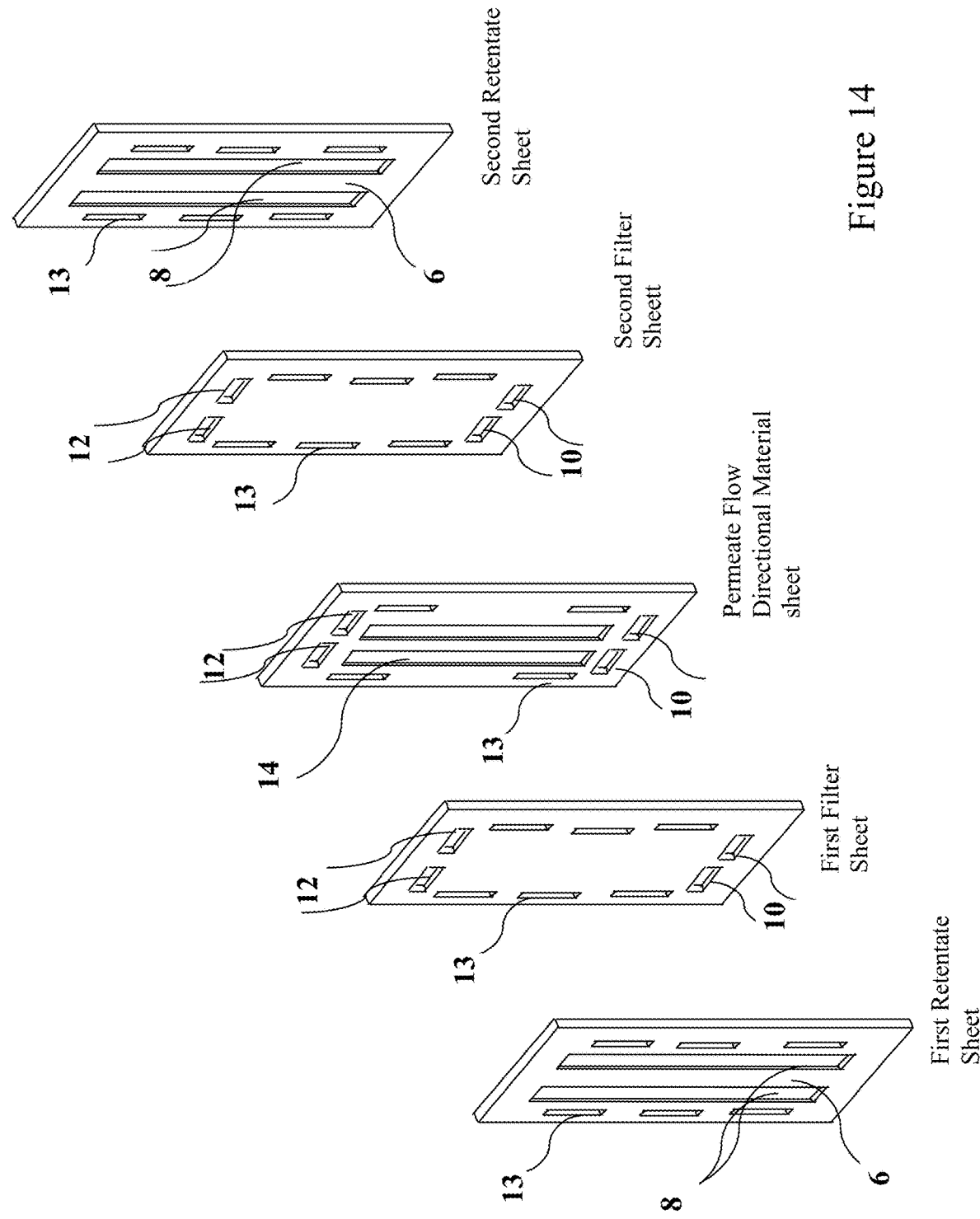
FIG. 14 shows an alternate representation of the stacking of components of the module incorporating permeate directional flow material to direct the path of the permeate.

FIG. 14 describes another embodiment wherein the use of a permeate flow directional material is used alone and comprising:

a. a first retentate sheet of suitable material, e.g. polysulfone, polyethersulfone, polycarbonate, urethane, silicone, or other compressible material of construction, having (i) at least one longitudinally extending rib or partition element 6, such partition element(s) when provided in multiple configuration being transversely spaced apart from one another and being of substantially the same height and substantially parallel to one another to define a single or a series of channels 8 between the partitions, extending longitudinally between the respective retentate inlet 10 and retentate outlet 12 basin openings of associated filter elements and permeate sheet members, on both faces thereof, (ii) permeate passage openings 13 at side portions of the sheets, and (iii) the retentate sheet aligned to the first sheet of filter material at respective end and side portions thereof, with the basin openings and permeate passage openings of the associated sheet members in register with one another and the permeate passage opening of the retentate sheet member being circumscribingly compressed to the first sheet of filter material, and with a central portion of the first sheet of filter material and the retentate sheet member being unbonded to permit permeate contacting the retentate sheet member to flow through the first sheet member of filter material to the foraminous permeate sheet member;

b. a first sheet member of filter material having (i) multiple basin openings, of a suitable shape, e.g., polygonal, semi-circular, or sector shape, at each of opposite end portions of the sheet member defining respective retentate inlet 10 and retentate outlet 12 passages, each basin being bounded by generally linear side edges defining corners of the basin at respective intersections of the side edges, and (ii) permeate passage openings 13 at the side portions of the sheet member, wherein the first sheet member of filter material is bonded to the permeate flow directional media sheet member at their respective end and side portions, with their basin openings and permeate passage openings in register with one another and the basin openings being circumscribingly bonded at respective end portions of the first sheet member of filter material and the permeate flow directional media sheet member, and with a central portion of the first sheet member of filter material and the permeate flow directional media sheet member being unbonded so as to define a central portion of the permeate flow directional media sheet communicating with the permeate passages in the first sheet member of filter material and in the permeate flow directional media sheet member;

c. a permeate flow directional material sheet member of e.g. polysulfone, polyethersulfone, polycarbonate, urethane, silicone, or other compressible material of construction have openings 14 for flow of the introduced permeate liquid medium, the sheet also has (i) multiple basin openings of suitable shape at each of opposite end portions of the sheet member defining respective retentate inlet 10 and retentate outlet 12 passages, each basin being bounded by generally linear side edges defining corners of the basin at respective intersections of the side edges, and (ii) permeate passage openings 13 at the side portions of the sheet member;

d. a second filter sheet as defined above; and e. a second retentate sheet as defined above and sealed to the second filter sheet.

Potential applications of the present invention include the following:

Power Generation—ion transfer;

Lithium recovery from seawater, "high" concentration pools—directed ion concentration, exchanging ions from upstream and downstream;

Sugar concentration, maple sugar, grape juice, etc;

Current NF systems limited due to high osmotic pressure (700 psi) required to drive filtration of concentrations over 10% (est.), using high concentration ions on permeate side will pull water from retentate side into the permeate side and drive higher sugar concentration in the retentate side;

Any separation where increased osmotic pressure created in the retentate limits the ability to concentrate the material in the retentate;

Any separation when a component in the retentate side can be influenced by concentration, electrochemical, ionic, differential solubility, or osmotic differences in the makeup of the fluid in the retentate channels and the makeup of the fluid in the permeate channels to pass through the permeable filter media;

Any separation when a component in the permeate side can be influenced by concentration, electrochemical, ionic, differential solubility, or osmotic differences in the makeup of the fluid in the retentate channels and the makeup of the fluid in the permeate channels to pass through the permeable filter media; and Any separation when a component in the retentate side can be influenced by concentration, electrochemical, ionic or osmotic differences in the makeup of the fluid in the permeate collection area and the makeup of the fluid in the retentate channels to pass through the permeable filter media.

That which is claimed is:

1. A cross-flow filtration unit providing for counter current filtration, the cross flow filtration unit comprising:

a first and second filter endplate, each filter endplate being substantially rectangular and having a length along a longitudinal axis, said length defined by a first end and a second end, and a width substantially perpendicular to the length, said width defined by a first side and a second side, wherein the length is greater than the width of each endplate; and an array of cross-flow members or sheets comprising a first retentate sheet, a permeate grouping, and a second retentate sheet, wherein each sheet is substantially rectangular and has a length along the longitudinal axis, said length defined by a first end and a second end, wherein the first and second retentate sheets have a multiplicity of flow channels extending longitudinally from the first end to the second end of each retentate sheet, and wherein the array of cross-flow members or sheets is positioned between the first and second filter endplates, wherein each endplate comprises:

an inlet retentate flow channel and an outlet retentate flow channel positioned in proximity of the first end and the second end of each filter endplate, respectively;

two permeate flow channels positioned perpendicular to the retentate flow channels, one positioned in proximity of the first side and the other positioned in proximity of the second side;

at least one retentate inlet port and at least one retentate outlet port in fluid communication with the inlet retentate flow channel and the outlet retentate flow channel, respectively; and at least one permeate inlet port and at least one permeate outlet port in fluid communication with each permeate flow channel and in fluid communication with the permeate grouping, and wherein the permeate grouping comprises: a first filter sheet; a stacked combination of a first permeate flow directional material sheet, a permeate flow directional media sheet, and a second permeate flow directional material sheet; and a second filter sheet, wherein the permeate flow directional material sheet has a first end and a second end and is defined by a multiplicity of permeate channel openings extending longitudinally from the first end to the second end of the material sheet, and wherein the permeate flow directional media sheet has a first end and a second end and comprises a woven material comprising a first bias extending longitudinally from the first end to the second end of the media sheet.

2. A cross-flow filtration unit according to claim 1, wherein the permeate flow directional media sheet further comprises a second bias and a third bias, both positioned substantially perpendicular to the first bias, wherein the second bias is positioned in proximity of the first end of the media sheet and directs permeate from the at least one permeate inlet port, and wherein the third bias is positioned in proximity of the second end of the media sheet and directs permeate to the at least one permeate outlet port.

3. A cross-flow filtration unit according to claim 1, wherein the permeate flow directional material sheet comprises a material selected from the group consisting of polyester, polypropylene, nylon, polytetrafluoroethylene, polyethylene, polysulfone, polyethersulfone, polycarbonate, urethane, silicone, and composites thereof.

4. The cross-flow filtration unit according to claim 1, wherein the at least one permeate inlet port is positioned at the same end as the at least one retentate outlet port.

5. The cross-flow filtration unit according to claim 1, wherein the at least one permeate inlet port is positioned at the same end as the at least one retentate inlet port.

6. The cross-flow filtration unit according to claim 1, wherein the retentate sheet flow channels and the permeate channel openings are positioned so that a solution pumped through one channel is drawn through a filter sheet to the other channel.

7. A separation method of at least one target substance from a source liquid, the method comprising the steps of:
providing at least one cross-flow filtration unit providing for counter current filtration as defined in claim 1, wherein at least one permeate inlet port is positioned at the same end of the filter endplate(s) as the at least one retentate outlet port;
introducing a flow of the source liquid comprising the target substance(s) into the retentate inlet port(s); and
introducing a permeate capture liquid medium into the at least one permeate inlet port and effectuating a sufficient flow of the source liquid comprising the target substance(s) through the flow openings of the retentate sheet(s), wherein the source liquid is in fluid communication with the permeate capture liquid medium in the permeate grouping such that the target substance(s) pass from the source liquid to the permeate capture liquid medium.

8. The method according to claim 7, wherein said physical separation of target substance(s) is based on their different molecular weights, size, osmotic pressure, concentration, preferred solubility, aqueous versus organic phases, and/or operating conditions.

9. The method according to claim 7, wherein the source liquid comprising the target substance(s) is pretreated to remove any unwanted material or larger solids from the source liquid before introduction into the cross-flow filtration unit.

10. The method according to claim 7, wherein the permeate capture liquid medium is introduced in counter current direction of the source liquid.

11. A method for desalinating seawater, the method comprising:
providing at least one cross-flow filtration unit providing for counter current filtration as defined in claim 1, wherein at least one permeate inlet port is positioned at the same end of the filter endplate(s) as the at least one retentate outlet port;
introducing a flow of the seawater into the retentate inlet port(s) and introducing a permeate desalinated liquid medium into the permeate inlet port(s), wherein the direction of the permeate desalinated liquid medium is counter to the flow of the seawater and effectuating, under pressure from between about 100 psi and about 1000 psi, a sufficient flow of the seawater comprising water molecules through the flow openings of the retentate sheet(s), wherein the seawater is in fluid communication with the permeate desalinated liquid medium in the permeate grouping such that isolated water molecules from the seawater pass from the seawater to the permeate desalinated liquid medium.

12. A method for diafiltration, the method comprising:
providing at least one cross-flow filtration unit providing for counter current filtration as defined in claim 1, wherein at least one permeate inlet port is positioned at the same end of the filter endplate(s) as the at least one retentate outlet port;
introducing a flow of a source solution into the retentate inlet port(s) and introducing a permeate capture liquid medium into the permeate inlet port(s), wherein the direction of the permeate capture liquid medium is counter to the flow of the source solution and effectuating, under pressure from between about 1 psi and about 1000 psi, a sufficient flow of the source solution containing buffers, ions, or non-target molecules through the flow openings of the retentate sheet(s), wherein the source solution is in fluid communication with the permeate capture liquid medium in the permeate grouping such that buffers, ions or non-target molecules from the source solution pass from the source solution to the permeate capture liquid medium.

13. The method of claim 12, wherein the buffer, ion, or non-target molecules passage is aided by a concentration differential between the source solution and the permeate capture liquid medium.

14. The method of claim 11, wherein the size of the permeate inlet port is smaller than the permeate outlet port.

15. The method of claim 12, wherein the size of the permeate inlet port is smaller than the permeate outlet port.

16. The cross-flow filtration unit according to claim 1, wherein the distance between the retentate flow channels along the longitudinal axis is greater than the distance between the inlet permeate port(s) and outlet permeate port(s).

* * * * *